United States Patent
Termeer

(10) Patent No.: US 11,663,636 B1
(45) Date of Patent: May 30, 2023

(54) APPARATUS AND METHOD FOR DETERMINING AND ORDERING PARTS FOR A VEHICLE

(71) Applicant: Dennis Termeer, Henderson, NV (US)

(72) Inventor: Dennis Termeer, Henderson, NV (US)

(*) Notice: Subject to any disclaimer, the term of this patent is extended or adjusted under 35 U.S.C. 154(b) by 0 days.

(21) Appl. No.: 17/379,859

(22) Filed: Jul. 19, 2021

(51) Int. Cl.
| | |
|---|---|
| *G06Q 30/06* | (2023.01) |
| *G06V 10/25* | (2022.01) |
| *G06V 30/224* | (2022.01) |
| *G06Q 30/0601* | (2023.01) |
| *G06K 7/14* | (2006.01) |
| *G06Q 10/20* | (2023.01) |

(52) U.S. Cl.
CPC ....... *G06Q 30/0601* (2013.01); *G06K 7/1417* (2013.01); *G06Q 10/20* (2013.01); *G06Q 30/0633* (2013.01); *G06Q 30/0643* (2013.01); *G06V 10/25* (2022.01); *G06V 30/224* (2022.01)

(58) Field of Classification Search
None
See application file for complete search history.

(56) References Cited

U.S. PATENT DOCUMENTS

| | | | | |
|---|---|---|---|---|
| 8,774,465 | B2 * | 7/2014 | Christopulos | G06V 20/20 382/104 |
| 9,195,986 | B2 * | 11/2015 | Christy | G06Q 30/01 |
| 9,349,140 | B2 * | 5/2016 | Christy | G06Q 30/0603 |
| 9,773,186 | B2 * | 9/2017 | Nepomniachtchi | G06V 10/28 |
| 10,796,354 | B1 * | 10/2020 | Termeer | G06V 20/62 |
| 11,017,351 | B2 * | 5/2021 | Sethi | G06Q 10/20 |
| 2012/0109660 | A1 | 5/2012 | Xu et al. | |
| 2013/0329943 | A1 * | 12/2013 | Christopulos | G06V 20/20 382/103 |
| 2013/0332488 | A1 * | 12/2013 | Christy | G06Q 30/0603 707/E17.005 |
| 2014/0270385 | A1 | 9/2014 | Nepomniachtchi et al. | |
| 2015/0052022 | A1 * | 2/2015 | Christy | G06Q 30/0603 705/26.63 |

(Continued)

FOREIGN PATENT DOCUMENTS

JP 2009198266 A * 9/2009

OTHER PUBLICATIONS

Parker, K., "Manufacturing Computer helps Ford mechanics with diagnoses," Providence Journal [Providence, R.I.] Feb. 22, 1989; G-28. (Year: 1989).*

(Continued)

*Primary Examiner* — Nicholas D Rosen
(74) *Attorney, Agent, or Firm* — Lewis Roca Rothgerber Christie LLP

(57) ABSTRACT

A method and apparatus for determining a part for a vehicle. The vehicle's vehicle identification number is determined, and the vehicle's manufacture information is determined. A specific part for the particular vehicle is identified. Whether a part code zone for the part exists on a vehicle identification label (VIN Label) is determined. If the part code zone exists on the VIN Label, then a zonal optical character recognition procedure is performed on the VIN Label and a part code in the part code zone is extracted. Or if the part code zone does not exist on the VIN Label, then a list of parts for the vehicle is determined based on the vehicle's manufacture information and the part is selected from the list of parts.

20 Claims, 16 Drawing Sheets

(56) References Cited

U.S. PATENT DOCUMENTS

2016/0078403 A1* 3/2016 Sethi .................. G06Q 10/0875
   705/26.81
2020/0327743 A1* 10/2020 Cannarsa ............... G06Q 40/08

OTHER PUBLICATIONS

Anon., "State Intellectual Property Office of China Releases Jilin University's Patent Application for Vehicle Vin Code Automatic Identifying System and Control Method Therefor," Global IP News. Automobile Patent News [New Delhi] Apr. 24, 2017. (Year: 2017).*

Yarlagadda Ramshankar, Deivanathan.R, "Development of Machine Vision System for Automatic Inspection of Vehicle Identification Number," International Journal of Engineering and Manufacturing (IJEM), vol. 8, No. 2 pp. 21-32, 2018. DOI: 10.5815/ijem.2018.02.03, Mar. 2018. (Year: 2018).*

Machine Translation of JP 2009-198266, Japan Platform for Patent Translation, translation Jan. 5, 2023. (Year: 2023).*

Souza et al., "Proposal of Automated Inspection Using Camera in Process of VIN Validation." Multibody Mechatronic System. Springer, Cham, 2015. 285-293.

* cited by examiner

| L | 1990 | Y | 2000 | A | 2010 |
|---|---|---|---|---|---|
| M | 1991 | 1 | 2001 | B | 2011 |
| N | 1992 | 2 | 2002 | C | 2012 |
| P | 1993 | 3 | 2003 | D | 2013 |
| R | 1994 | 4 | 2004 | E | 2014 |
| S | 1995 | 5 | 2005 | F | 2015 |
| T | 1996 | 6 | 2006 | G | 2016 |
| V | 1997 | 7 | 2007 | H | 2017 |
| W | 1998 | 8 | 2008 | J | 2018 |
| X | 1999 | 9 | 2009 | K | 2019 |

APPARATUS AND METHOD FOR DETERMINING AND ORDERING PARTS FOR A VEHICLE

FIELD OF THE INVENTION

This invention concerns vehicles and, more specifically, to determining, purchasing, and installing parts or ordering services for a vehicle.

BACKGROUND

Vehicles and automobiles are a routine and essential component of everyday life across the world. That includes vehicles for personal use as well as vehicles for commercial use. Vehicles come in a wide diversity of styles, shapes and sizes, such as 2-wheel motorcycles, compact 2-door cars, 4-door sedans, pickup trucks, SUVs, sports cars, vans, commercial transport trucks, and the like.

Vehicles typically comprise several individual parts that contribute to the overall functioning and performance of the vehicle. These parts usually vary for each vehicle, almost always depending on the particular make, model, and year of the respective vehicle. These parts may include, for example, air filters, fuel filters, fuel pumps, windshield wiper blades, windshields, lights, light bulbs, tires, spark plugs, shock absorbers, to name a few.

Vehicles typically require some parts to be replaced during the life of the vehicle. Normal wear items may include, for example, batteries, tires, oil changes, etc. The new parts or services may be necessary to replace malfunctioning or damaged parts. Other times, the replacement parts may be required for the routine maintenance and upkeep of the vehicle. Parts for routine maintenance may include tires, windshields, spark plugs, oil filters, windshield wipers, light bulbs, and the like. Such replacement parts, whenever needed, are important for the continued proper performance of the respective vehicle.

Vehicle owners usually rely on professional resellers for obtaining parts or services. These may include retail stores, online retail sites, vehicle dealerships, service garages, and the like. Such resellers add a substantial premium, or profit margin, to the cost of the new parts. These additional costs are ultimately borne by vehicle owners.

Obtaining replacement parts for a vehicle poses a challenge for the average consumer because each replacement part must be the precise one for the respective vehicle. That is of critical importance because unless the replacement part is the exact part, it will not fit or function properly on the vehicle.

A common layperson, however, does not possess the tools or mechanisms to conveniently determine and inexpensively acquire the proper replacement part needed for their particular vehicle. One of the primary challenges is to accurately determine the specific replacement part needed for their particular vehicle. As a result, vehicle owners tend to either leave the previous damaged or malfunctioning parts on their vehicle, or seek assistance from a professional automotive repair service. Such as from a service center at an automobile dealership or an auto parts retail store. The vehicle owner thus pays a premium for the replacement part or service, usually a considerable premium, to obtain the correct replacement part or service.

After determining and purchasing the correct part or service, the vehicle owner still faces the task of installing the new part correctly in his vehicle. Unless installed correctly, a new part will not function properly.

Installing a new part in a vehicle is a technical process, it requires at least some degree of knowledge and mechanical aptitude, as well as the proper tools. An average consumer does not have the technical and mechanical skills, or the specific tools, required to properly install new parts in vehicles. An automotive service professional is usually necessary for the task.

Automotive service professionals are not always readily available. Vehicle owners typically have to make an appointment, and then take the vehicle in for installing the new part at that specific date and time. This can be inconvenient for the vehicle owner, and sometimes causes undesirable delays for installing a new part that is necessary for operating the vehicle in the meantime.

Accordingly, it is desirable to have a mechanism, device, process, apparatus, and method for a layperson to conveniently and accurately determine the specific part needed for his particular vehicle. It is also desirable for a layperson to be able to conveniently and inexpensively purchase those specific parts. It is further desirable for a layperson to be able to have a new part properly installed in his vehicle, or for services to be performed on his vehicle, conveniently.

SUMMARY OF THE INVENTION

The present invention provides a method and apparatus for accurately determining an exact part for a vehicle, and for a consumer to be able to conveniently purchase that part. Further, the present invention and apparatus provides the user a convenient option to have a new part properly installed in their vehicle or to have a service performed on their vehicle.

A software application is provided on a computer device. The software application comprises executable instructions stored in a non-transitory computer readable medium and executed by a processor. The software application may be an app running on a smartphone, a website hosted on a server, or the like.

A user may perform a read operation for information provided on a vehicle's vehicle identification number label ("VIN label"). The read operation may comprise capturing a visual image of the VIN label with an image capturing device, reading an RFID chip, scanning coded information, or the like. VIN labels are mandatory for vehicles and are provided on every vehicle. The read operation may be performed with any technology or device known in the art, such as capturing a visual image with a device capable of capturing images, such as a portable camera, a smartphone, an iPad, or the like.

The information from the read operation performed on the VIN label may be transferred to the application or to the computer device. A data recognition procedure is performed on that information, such as an optical read procedure on a visual image of the VIN label. The data recognition procedure helps determine the vehicle's vehicle identification number ("VIN number"). The data recognition procedure may comprise any method known in the art for reading data information from a surface, such as scanning a coded image provided on the VIN label, such as a bar code or a QR code. This data information is used to decipher a corresponding string of alphanumeric characters that comprise the vehicle's VIN number. Alternatively, the procedure may extract the alphanumeric VIN number that is imprinted on the VIN label.

Alternatively, if the data recognition procedure fails to determine the VIN number, or if the user prefers to, the user may enter the VIN number manually.

Once the vehicle's VIN number has been determined, a check may be performed to verify whether the VIN number is valid. The character in the 10th position of a vehicle's 17-digit VIN number helps determine whether the VIN number is valid. If the VIN number is not valid, the steps to determine the VIN number may be repeated or the user may manually enter the vehicle's VIN number.

Certain characters in a VIN number include alphanumeric characters that correspond to the vehicle's manufacture information, such as the vehicle's year, make, and model. A data storage device may be queried to determine the vehicle's manufacturing information based on these particular alphanumeric characters. The determined manufacture information may be displayed to the user for confirmation.

Alternatively, the user may be provided an option to manually enter certain manufacture information for the vehicle, such as the vehicle's year, make, and model.

Vehicle manufacturers typically utilize unique part codes, or numbers, for most of the parts that are used in their vehicles. In the automotive industry these unique codes, or numbers, are referred to as original equipment manufacturer codes, or OEM codes. Certain OEM information, or certain details about parts for a vehicle, are sometimes provided in a certain location, or zone, on the vehicle's VIN label. Many vehicle manufacturers provide at least some OEM codes, or certain part information, on their vehicles' VIN labels. If a vehicle manufacturer prints such information on their VIN labels, they usually print it at the same predetermined location on their vehicles' VIN labels.

In one embodiment, zone information for OEM codes, or for certain vehicle part information, that is provided on a certain vehicle manufacturer's VIN labels is stored in a data storage. The application can query the data storage and determine whether the respective vehicle includes certain OEM information, or a certain part number, on its VIN label, as well as the parameters of the zone where that information is provided on those VIN labels. This query is based on the vehicle's manufacture information, which was determined previously.

If the particular VIN label includes such a zone for a desired part, a read procedure, such as a zonal optical character recognition ("ZOCR") procedure, may be performed on the image of the VIN label to glean that desired OEM code, or part information, provided in that zone. This determines the desired OEM code or part number for the particular vehicle.

Alternatively, if the particular VIN label does not include a desired OEM code or part number, or if that information could not be extracted by the zonal optical character recognition procedure, a data storage device may be queried to determine all parts and their respective OEM codes, corresponding to the particular year, make, and model of the vehicle. All of those options may be displayed in some predetermined organized manner for the user to select the specific part or service that they need. This information may also be presented to the user in a searchable manner, allowing the user to narrow his search with key words, such as "tire," "brake," "windshield, "engine," or the like. This may provide only a few options of part names and descriptions, from which the user may select one. That part will have a corresponding OEM code, or a part number, thereby identifying the exact part that the user needs.

OEM parts generally have a corresponding aftermarket part number. Aftermarket parts tend to be cheaper than their corresponding OEM parts, whereby some customers may prefer purchasing the aftermarket part rather than the OEM part. In one embodiment, the user is provided an option to select either the OEM part or the corresponding aftermarket part. It is anticipated that alternate embodiments of the present invention may provide users the option of an OEM part, a corresponding aftermarket parts, or both. This includes both, for purchasing the part and for installation services to install the respective part.

In one embodiment, the user may be provided an option to purchase the particular part that was selected. If the part is manufactured by more than one manufacturer, the different manufacturers and their respective prices may be displayed for the user to select one.

In one embodiment, the user may be provided an option to have the part installed on their vehicle. This may be done by an automotive professional or by someone knowledgeable and experienced in installing such parts in vehicles. Automotive professionals and individuals knowledgeable and experienced in installing such parts may sign up as providers of the service in a predetermined geographical area. One of them located in the user's geographical area may then be selected by the user opting to purchase installation for a purchased part.

If the user opts to purchase any parts, or installation of the part, an e-commerce transaction procedure may be performed where the user's order information, shipping information, etc, is collected and a payment is processed. The order information may then be forwarded to a computer device, such as an e-commerce server, for processing and shipment, as appropriate.

DETAILED DESCRIPTION

The systems, methods, and apparatus of the present invention are described herein with reference to the figures. The description and figures are for illustrative purposes only; they do not limit the true scope and spirit of the present invention. The true spirit and scope of the present invention is evidenced by the specification, the figures, and the claims.

Vehicles manufactured and sold commercially typically include a vehicle identification number (VIN) label from the vehicle's manufacturer. In several jurisdictions VIN labels are mandatory, required by law. VIN labels typically include certain information about the vehicle, such as the vehicle's identification (VIN) number, information about the vehicle's tires, its weight, and the like. Vehicles typically have a plurality of VIN labels implemented in them. A VIN label with more information is typically installed on the door or doorjamb on the driver's side of the vehicle.

Figure 1:
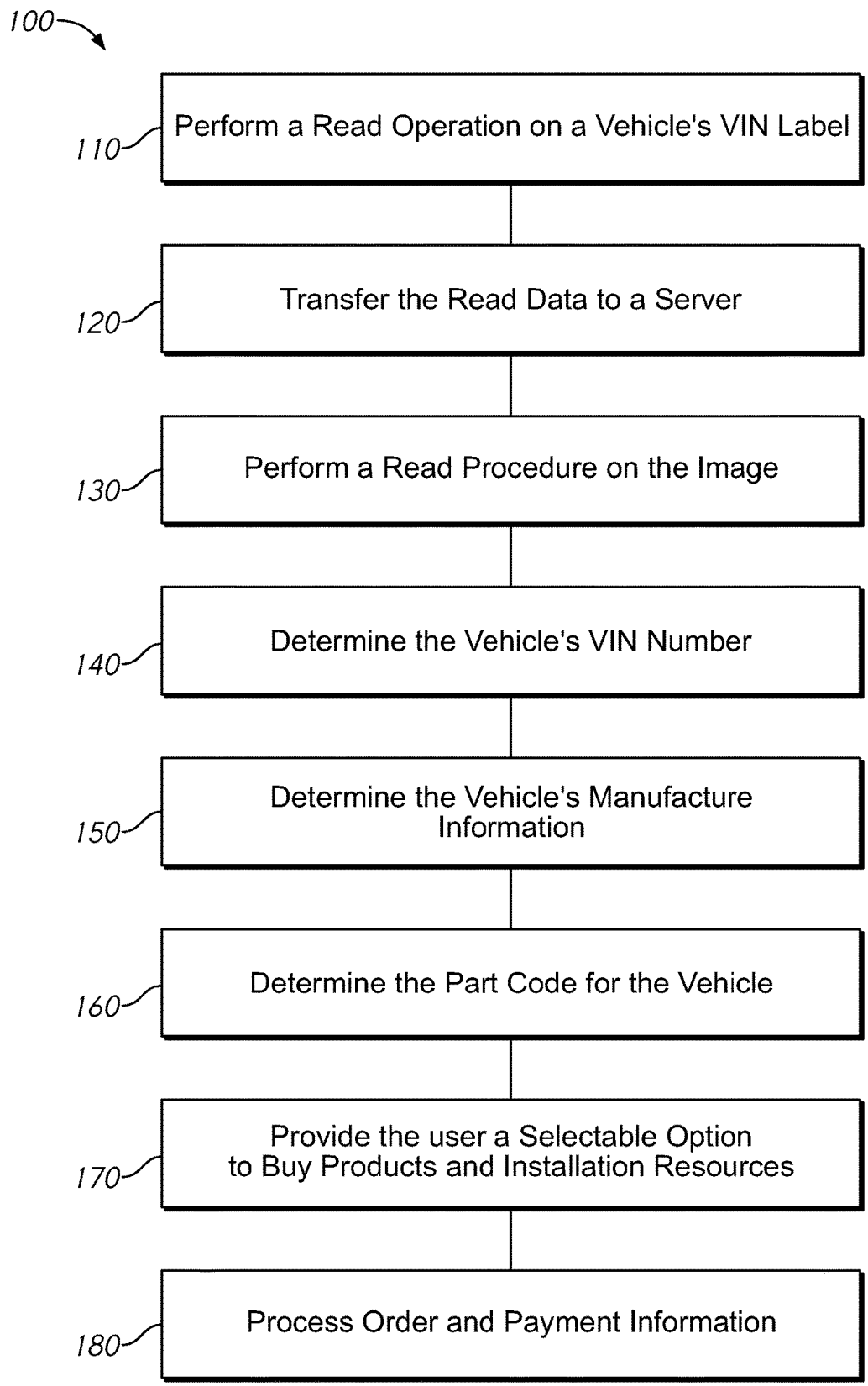
FIG. 1 is a flow chart that helps describe a method according to some embodiments of the present invention.

Referring to FIG. 1, flow chart 100 helps describe a method according to some embodiments of the present invention. In flow chart 100, a read operation is performed on the vehicle's VIN label 110. The read operation 110 may be any operation known in the art for gleaning information from a label, such as by reading an encrypted code, such as a QR code, by sensing an RFID chip, by visually reading the label, or the like. All methods in the art that exist now or which may be implemented in the future for reading information from a VIN label are therefore anticipated for the purposes of practicing the present invention, and are therefore intended to be covered by the present claims.

In one embodiment, a user captures an image of a vehicle's VIN label with an image capturing device for the purposes of performing a read operation (110) on the VIN label. The image capturing device may be any device, typically a portable device, known in the art for electronically capturing visual images. The device may be, for example, a digital or electronic camera, a mobile communications device such as a cellular phone with a built-in camera, a smartphone with a camera, a tablet with a camera, an iPad, a laptop computer with a camera, or the like. The mobile communication device may also be a personal digital assistant (PDA), a tablet computer, or other mobile electronic device that has a built-in camera.

Figure 2:
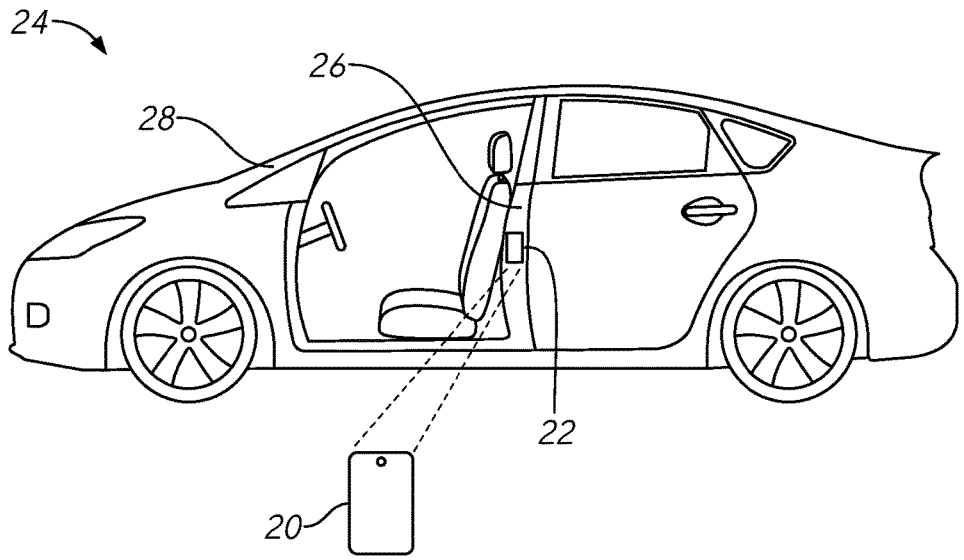
FIG. 2 is an illustration of an image capturing device for capturing an image of a vehicle identification number (VIN) label on a vehicle, with the vehicle depicted in partial view and with the driver's side front door removed.

Referring to FIG. 2, an image capturing device 20 is used to capture an image of a VIN label 22 located on the driver's side door or doorjamb 26 of a vehicle 24. Although the user may capture an image of a VIN label located elsewhere on the vehicle 24, such as on the driver's-side dashboard 28, the VIN label 22 located on the door or doorjamb 26 on the driver's side is preferable because it typically includes more information. Other VIN labels on the vehicle 24 having comparatively lesser information should still be adequate for purposes of the present invention because they include the vehicle's 24 VIN number.

Figure 3:
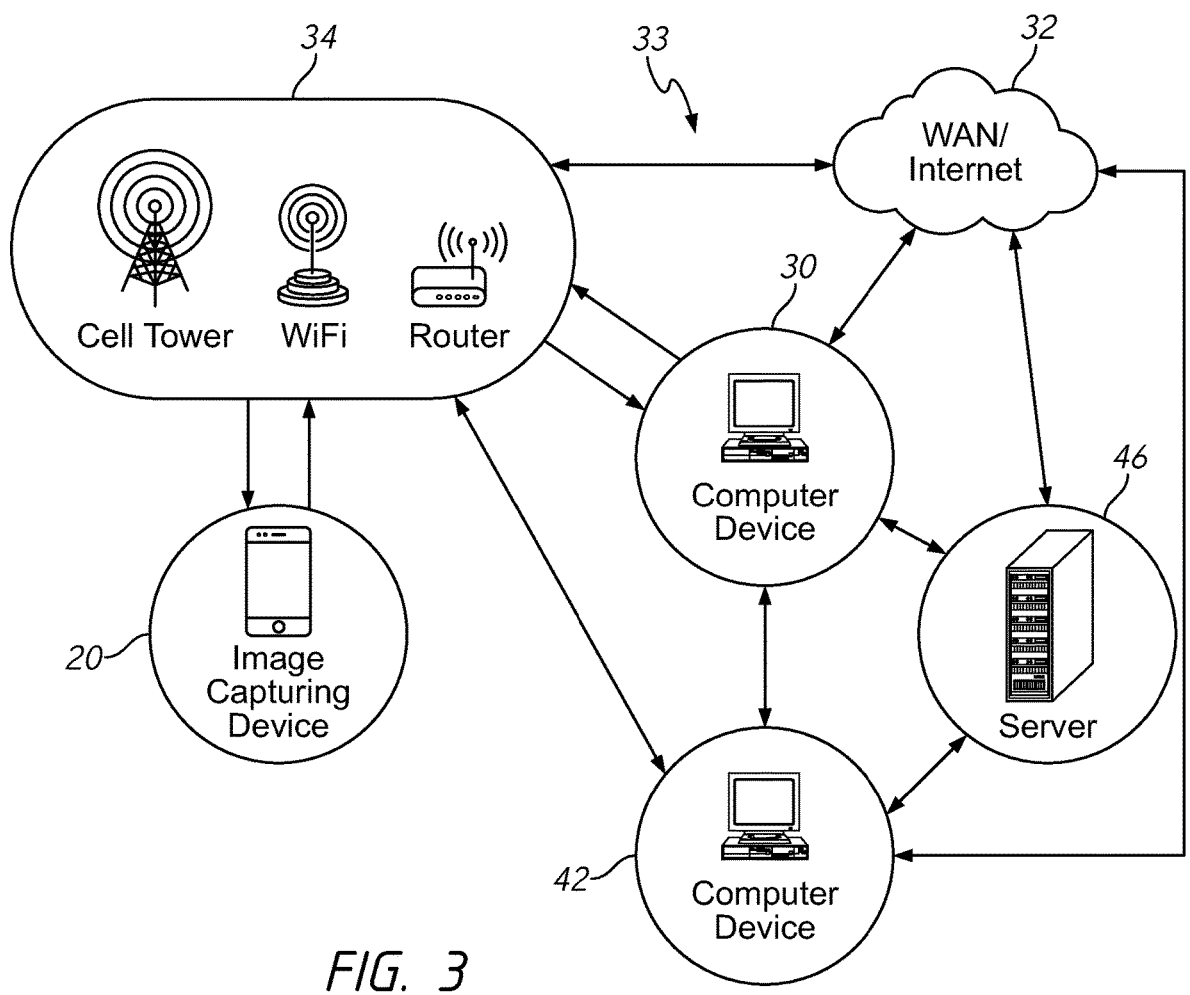
FIG. 3 is a representation of a computerized system with computer devices, apparatus, and the like, in data communication with each other in accordance with some embodiments of the present invention.

FIG. 3 shows a representation of a computerized system 33 with computer devices, apparatus, and the like, in data communication with each other according to some embodiments of the present invention. An image capturing device 20 is in data communication with a computer device 30, which data communication in one embodiment may be via a wide area network 32 such as the internet. In some embodiments, data communication between the various computer devices and apparatus in computerized system 33, such as between image capturing device 20 and computer device 30, is facilitated via wireless cellular services 34 provided by a mobile telephone services company. In other embodiments, data communication between a device in computerized system 33 and wide area network 32, or with other apparatus, may be facilitated through a WiFi connection, a hard-wired link via a router, or any other appropriate means known in the art for electronic communications.

In alternate embodiments, a device in computerized system 33 may be coupled to another device, such as coupling image capturing device 20 to a computer device 30, using a cable, USB, Firewire, or the like, or using a wireless means, such as WiFi, Bluetooth, wireless USB, or the like. This eliminates the need for a network for the two devices to communicate with each other. Data communication between the two devices may be accomplished by any means known in the art for data communication between two electronic devices.

A computer device in a computerized system, such as computer device 30 in computerized system 33, may be any computer device known in the art. In some embodiments, image capturing device 20 is also a computer device. A computer device typically comprises a display, an input means, at least one processor, a non-transitory computer readable medium, and an operating system defining a local file system on the non-transitory computer readable medium. One or more processors are capable of reading and executing specialized logic associated with computer programs and applications running on the computer device. One or more processors are capable of creating, manipulating, altering, and storing data objects and computer data structures in the non-transitory computer readable medium. The computer device may include persistent storage, e.g. magnetic or optical disk, PROM, flash prom or ROM, or the like, that is operable to store computer programs, applications, and other data that is usable by the computer device. The computer device uses input and output interfaces to interface with or to communicate data with the outside world, including with other computer devices or apparatus in a computerized system. Such data communication may occur directly between two devices, over a local area network, over a wide area network such as the internet, wirelessly, or in any other manner known in the art for electronic data communications between two computer devices. The computer device may be, for example, a personal computer, a computer server, a laptop computer, a tablet, a smartphone, a cellular mobile device, an iPad, or the like. In some embodiments, the computer device may be configured differently without one or more of the components mentioned above. For example, in the instance of a server, the computer device may not include a display. Accordingly, a computer device in a computerized system of the present invention is anticipated to be any computing device known in the art with a processor and capable of executing instructions. All such devices are, therefore, anticipated and are included in the spirit and scope of the present invention.

A non-transitory computer readable medium in the computer device is operable to store an application comprising instructions that are executable by one or more processors in the computer device. The application may be an app, a web browser, a software program, or the like, running on the computer device. An app, or the like, is typically executable locally on the computer device, such as on image capturing device 20. On the other hand, a browser, or the like, would be configured to access websites or other applications hosted on another computer device, such as on a remote computer server. The computer device will be in data communication with the other computer device via any means known in the art, such as via a network like the internet.

In all such embodiments a user may interface with the application via a user interface means associated with the computer device, while corresponding computerized actions, such as methods and steps associated with practicing the present invention, are performed either on the computer device or on another computer device in data communication with the first computer device, or on a combination thereof. All such embodiments, therefore, are anticipated and are deemed to be within the spirit and scope of the present invention.

The application on computer device, such as on image capturing device 20 or on computer device 30, may be installed from a data storage medium like a CD, or it may be downloadable in any number of ways known in the art, such as from an application store, from a computer device or server accessible via the Internet, from a desktop computer, from another hand-held device, or the like. Once the application is installed, the application may become a resident application on the computer device. In one embodiment, the application is an app and the computer device is a hand-held device such as a smartphone. In another embodiment the application is a software program running on a desktop or on a laptop computer. In another embodiment the application is a browser running on the computer device.

The data from the read operation (110) is transferred to computer device 30 (120). In one embodiment, the data from the read operation (110) is an image of a VIN label captured by image capturing device 20. The data from the read operation (110) is received by an application running on computer device 30, and in some embodiments is stored in a non-transitory computer readable medium on computer device 30. If the application is a browser, a user may interface with the browser to access a website, whereby the browser will cause another computer device to receive the data from the read operation (110) of the VIN label.

Figure 5:
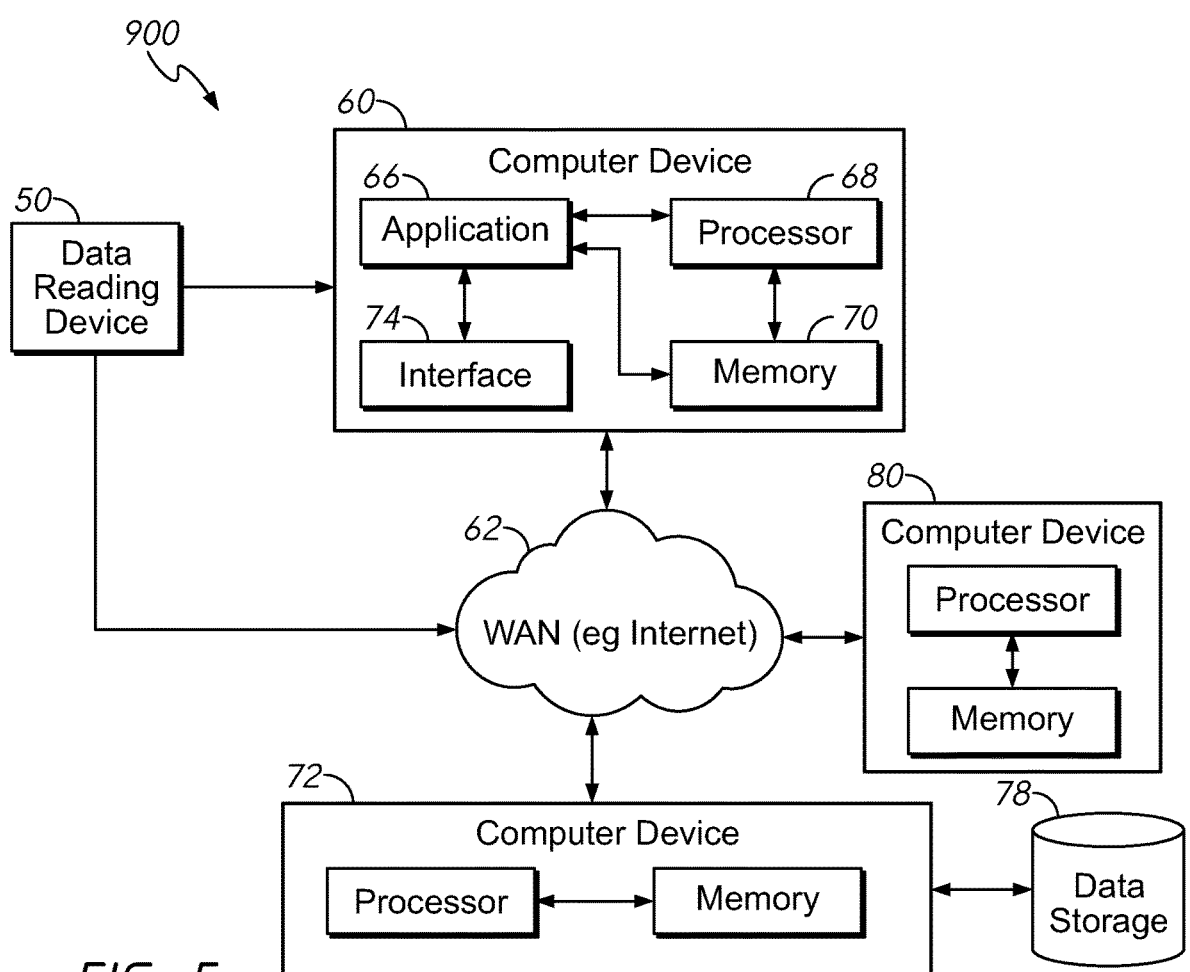
FIG. 5 is a block diagram illustrating a computerized system with computer devices, apparatus, and the like, in data communication with each other in accordance with some embodiments of the present invention.

FIG. 5 shows a block diagram of a computerized system 900 according to one embodiment of the present invention. Computerized system 900 comprises computer devices, apparatus, and the like, that are in data communication with each other. Computerized system 900 may comprise any number and types of computer devices and apparatus. The various computer devices and apparatus separately comprise executable instructions which, collectively, implement the teachings of the present invention across the various computer devices and apparatus in computerized system 900.

One computer device in computerized system 900 is computer device 60. Computer device 60 comprises an application 66 running on it. Application 66 comprises instructions executable by a processor 68. Application 66 and processor 68 interface with a non-transitory computer readable medium, such as a memory 70. In this embodiment, data from a read operation of the VIN label is transferred and is received by computer device 60. In one embodiment, the data is an image of a VIN label. Data reading device 50 may communicate data with computer device 60 either directly or via a wide area network such as the internet 62. In one embodiment, application 66 receives the read data of the VIN label and stores it in memory 70.

Figure 4:
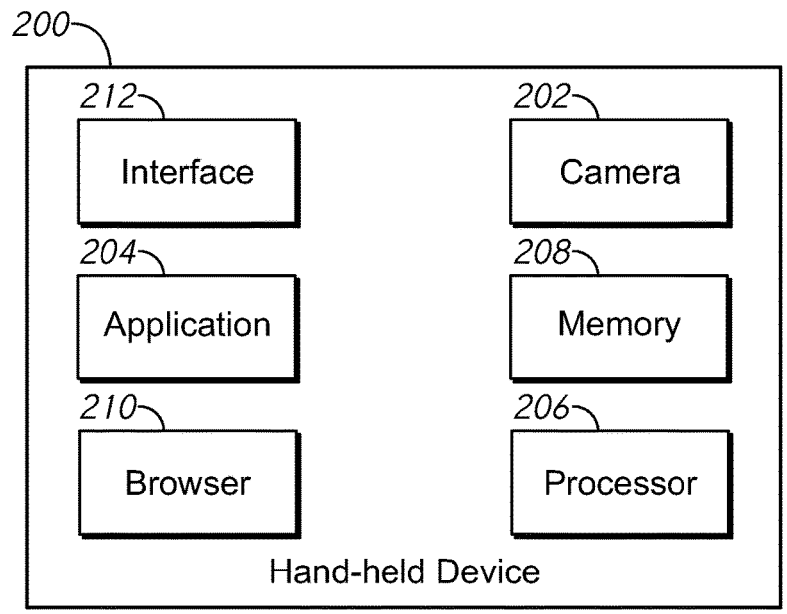
FIG. 4 is a block diagram of a hand-held device and some of its components according to one embodiment of the present invention.

In an alternate embodiment, data reading device 50 is a hand-held device capable of performing at least some functions similar to a computer device. FIG. 4 shows a block diagram of one embodiment of a data reading device that is a hand-held device 200 according to one embodiment of the present invention. Hand-held device 200 may be an electronic data reader, a cellular phone, a smartphone, a tablet, an iPad, or the like. In one embodiment, hand-held device 200 comprises a camera 202 that is capable of capturing images or for scanning barcodes, QR codes, or the like. Hand-held device 200 has a processor 206 and an application 204 comprising instructions executable by processor 206. Application 204 resides in a non-transitory computer readable medium, which may be a memory 208 in one embodiment. A user may interact with, or operate, a user-operable interface 212 to read data, such as to capture an image of a VIN label using camera 202. The data is received by application 204, and may be stored in memory 208.

The term application is used in some instances to refer to an installed mobile app on a hand-held device, such as on a mobile communications device, smartphone, or the like. However, as a practical matter the terms application and app may be used interchangeably. Application 204, therefore, may be an app, a browser, or the like, running on hand-held device 200, or it may be a software application or a browser running on a personal computer, laptop, or the like. Accordingly, the functions described may be performed by software running on a personal computer or on a hand-held device, and therefore various terms may be used interchangeably while the methods described herein will apply to most such embodiments.

An app would typically be executable locally on a local computer device, such as on a hand-held device 200, while a browser would typically be configured to execute locally on a local computer device and access websites or other applications hosted or executed on a remote computer device, such as on a computer server located elsewhere. However, an app may also be configured to be executable locally and access websites or other applications hosted or executed on a remote computer device while remaining consistent with the teachings of the present invention.

In one embodiment, hand-held device 200 is in data communication with a remote computer device. The data communication may be facilitated via, for example, a wide area network such as the internet. A user may operate a browser via interface 212 on hand-held device 200 to access a website that is hosted on a remote computer device whereby the website receives the data from the read operation of the VIN label via the browser. In another embodiment, a user may operate a browser on a different type of computer device, such as a personal computer, to access a website on a remote computer device whereby the website receives the data from the read operation of the VIN label via the browser. In all such instances a user interacts with an application via an interface on the local computer device while certain computerized steps may be performed either on the local computer device or on a remote computer device. All such methods and apparatus, therefore, are anticipated and are deemed to be within the spirit and scope of the present invention.

A user may manipulate and operate the functions of application 204 and of hand-held device 200 via interface 212. In one embodiment, interface 212 is a touch screen, such as on a smartphone, with various options and selections displayed for the user to select or operate the different functions or features of application 204 by touch. The screen receives touch gestures from the user to operate and manipulate the interface. In other embodiments, interface 212 may be a keyboard, keys, switches, buttons, or a combination thereof, or it may be any other apparatus or method known in the art to allow a user to interface with a hand-held device or with a computer device.

Once the data from the read operation of the VIN label is transferred and received (120), such as by application 66 on computer device 60 or by application 204 on hand-held device 200, a read procedure may be performed on the data, such as by performing an optical recognition (OR) operation on the image of the VIN label (130).

The read procedure 130 is an OR procedure in one embodiment. Generally, optical recognition systems are computerized systems known in the art that read or interpret information, such as coded images or text, from documents, tags, labels, or the like. The read procedure 130 is performed on the image of the VIN label for reading and interpreting the information provided on the VIN label.

A VIN label typically includes several items of data, which correspond to information pertaining to the vehicle, including the vehicle's VIN number. A VIN label sometimes includes the VIN number encoded in a coded image. The coded image may be of any format known in the art that comprises data coded therein. Some examples of coded images include a bar code, a QR code, a maxicode, a data matrix, a code one, a soft-strip code, and the like.

Figure 6:
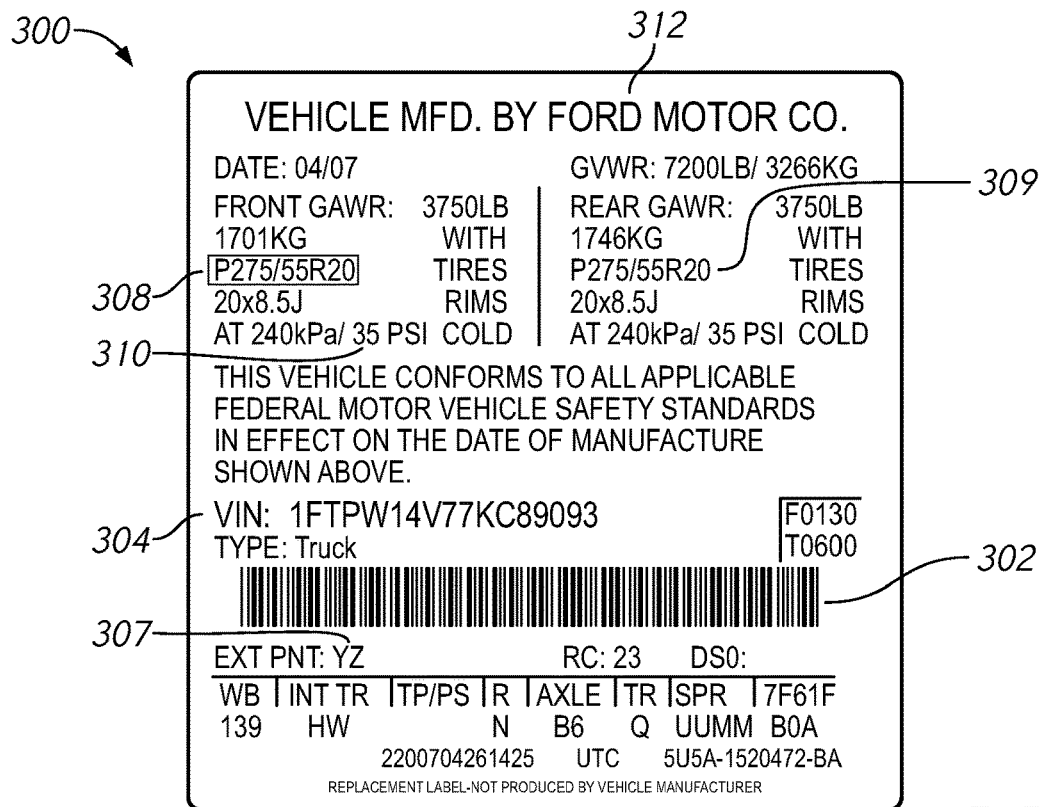
FIG. 6 is an example of a vehicle's VIN label.

FIG. 6 shows an example of an image of a VIN label. VIN label 300 is for a vehicle manufactured by Ford Motor Co. VIN label 300 includes several pieces of information pertaining to its respective vehicle. For example, information on the VIN label 300 includes the vehicle's tire size 308, wheel size, tire pressure 310, manufacturer's name 312, VIN number in alphanumeric character form 304, VIN number encoded in a coded image 302, etc. As evident from the image of VIN label 300, these various pieces of information are positioned at different locations on VIN label 300. Other vehicle manufacturers, however, position such information at different locations on VIN labels for their vehicles.

The read procedure on the data from the read operation on the VIN label (130) may be performed by any computer device or apparatus in a computerized system. Some embodiments of a computerized system 33 and 900 are shown in FIG. 3 and FIG. 5. For example, the read procedure may be performed (130) on computer device 30 or on hand-held device 200, depending on which device received the data from the read operation on the VIN label (120) in the particular embodiment. In one embodiment, the read procedure is performed (130) on another computer device 42 that is in data communication with the computer device that received the data from the read operation on the VIN label (130). In an alternate embodiment, the read procedure is performed (130) on a remote computer server 46 that is in data communication with the device that received the data from the read operation on the VIN label (130). Data communication between the computer devices may occur in any manner known in the art, such as through a direct connection, either hard-wired or wireless, through a WiFi connection, through a local area network, through a cellular data network, through a wide area network such as the internet, or the like.

The read procedure typically comprises a method or process for deciphering information on the VIN label. In one embodiment, it comprises scanning, or reading, coded information on the VIN label. This may include, for example, scanning a bar code or a QR code on the VIN label. Additionally, it may comprise performing an OR procedure, whereby characters, such as alphanumeric characters, on the VIN label are recognized and identified.

Figure 7A:
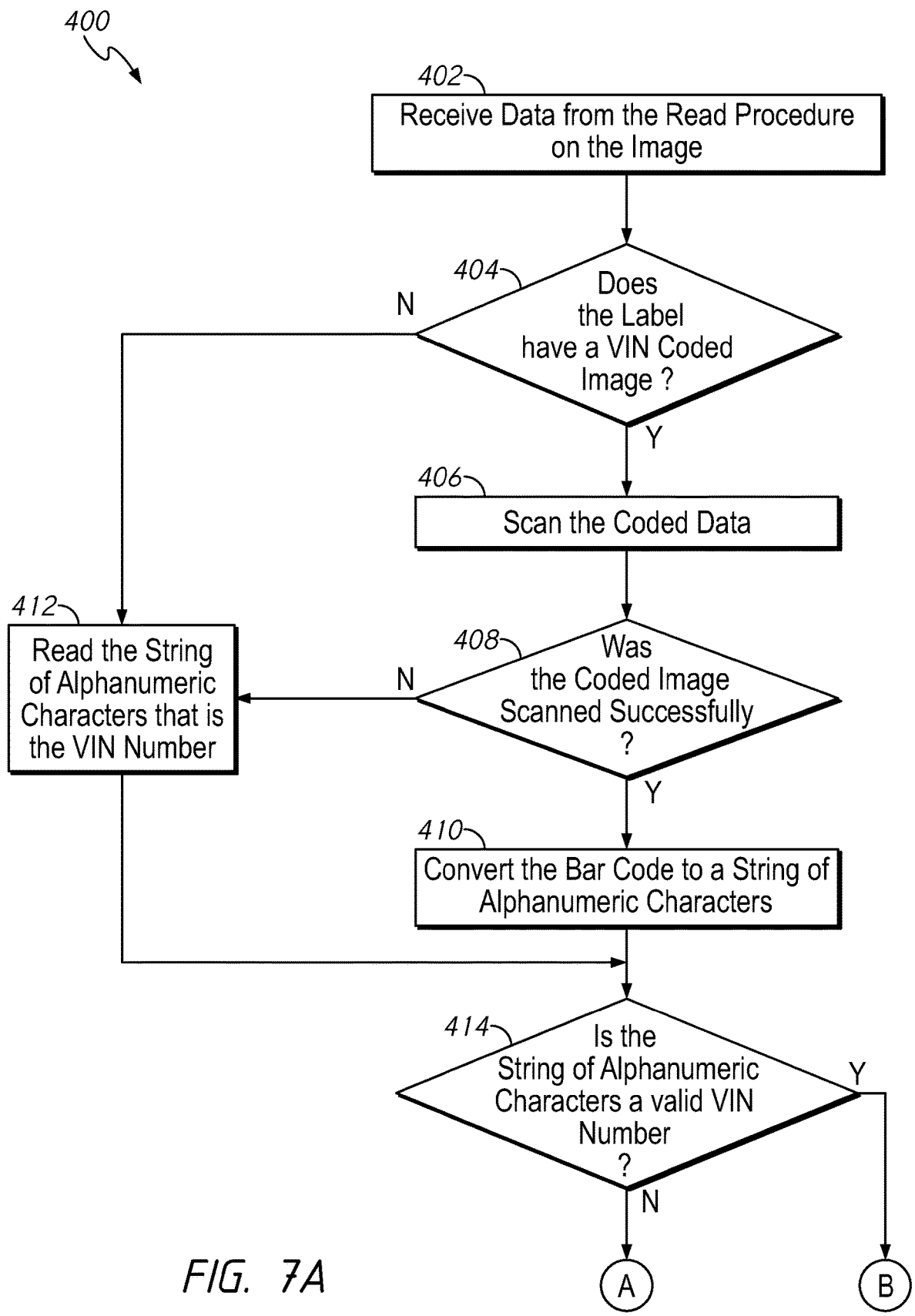
FIG. 7A is the first part of a flowchart of one embodiment of a process to determine certain manufacture information for a vehicle.
Figure 7B:
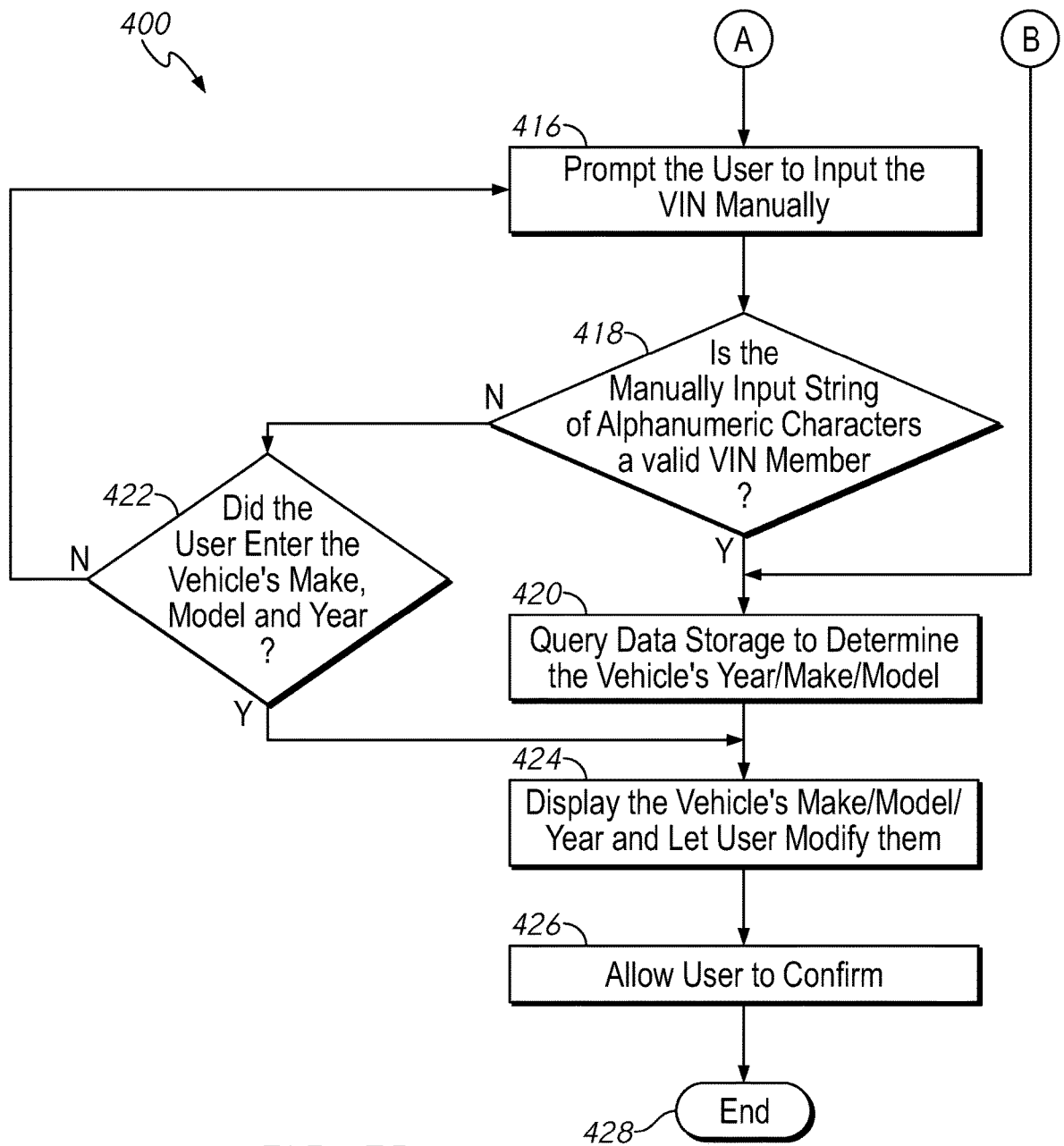
FIG. 7B is the second part of the flowchart of FIG. 7A.

In one embodiment, the read procedure (130) helps determine certain manufacture information for the vehicle. FIGS. 7A and 7B show a flowchart 400 for one embodiment of a method for determining manufacture information for the vehicle. In flowchart 400, a read procedure is performed on an image of a VIN label (130), and information from the read procedure is received by an application on a computer device, such as by application 66 on computer device 60.

Flowchart 400 has a method for determining the vehicle's VIN number (140). In one embodiment, application 66 is configured to determine the vehicle's VIN number (140). In one embodiment, application 66 determines the VIN number locally on computer device 60, while in another embodiment, the VIN number is determined by another computer device in computerized system 900. If the VIN label has coded data, such as a coded image, with the vehicle's VIN number 404, a scanning process performed on the VIN label 406 reads it and decodes it. Such reading and decoding of coded images is known in the art. VIN label 300, for example, shows a coded image 302 in the form of a bar code. This bar code can be scanned, read, and decoded, the technology for which is known in the art.

If the coded image is scanned successfully 408, it generates a string of alphanumeric characters 410, which is the vehicle's VIN number. The string of alphanumeric characters comprising a VIN number is typically 17 digits in length, although it is anticipated that vehicles or other embodiments of the present invention comprise a VIN number with a different number of digits. The teachings of the present invention can be scaled or extended by one skilled in the art to apply to such alternate embodiments.

If, on the other hand, the VIN label does not have a coded image for the vehicle's VIN number, or if the coded image is unable to be read or scanned properly, the string of alphanumeric characters on the VIN label that is the vehicle's VIN number is extracted 412 from the information generated by the read procedure 402. VIN labels typically have an alphanumeric VIN number 304, which can be read and extracted by the read procedure 402.

Figures 9, 10:
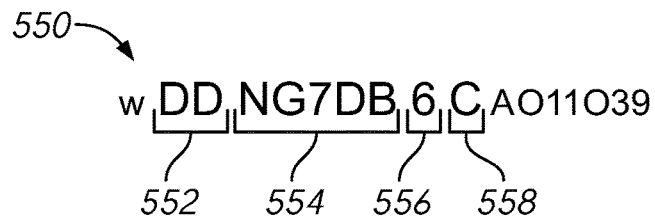
FIG. 9 shows an example of a vehicle's 17-digit VIN number, with digits in certain positions enlarged to identify them for representing certain information regarding the respective vehicle.
FIG. 10 is a table that shows a mapping of 1-digit alphanumeric characters that correspond to a particular year of manufacture for vehicles.

FIG. 9 shows an example of a 17-digit VIN number 550 for a vehicle. Digits in certain positions of the VIN number 550 are enlarged to help identify them.

A 17-digit alphanumeric VIN number typically includes certain specific information. Digits in certain positions of a VIN number represent certain information about the corresponding vehicle. For example, the ninth digit in a VIN number is a check-digit, which helps determine whether the VIN number is a valid VIN number. In VIN number 550, for example, that ninth digit 556 is "6." Algorithms to determine the value of the check-digit and to verify whether the corresponding VIN number is valid are public information and are known in the art. These algorithms can be implemented in a computer device of the present invention by one skilled in the art.

In flowchart 400, the check-digit is used to determine whether the VIN number is valid. In VIN number 550, for example, for the check digit 556 "6," a check may be performed by computerized device 60 in computerized system 900 by running an appropriate algorithm on the VIN number 550 to verify whether that the VIN number 550 is valid.

If the VIN number is not valid 414, the user may enter the VIN number manually, such as in application 66 by using interface 74, or in application 204 by using interface 212. In one embodiment, the user is prompted to manually enter a VIN number 416 if the VIN number is not valid 414.

Figure 8:
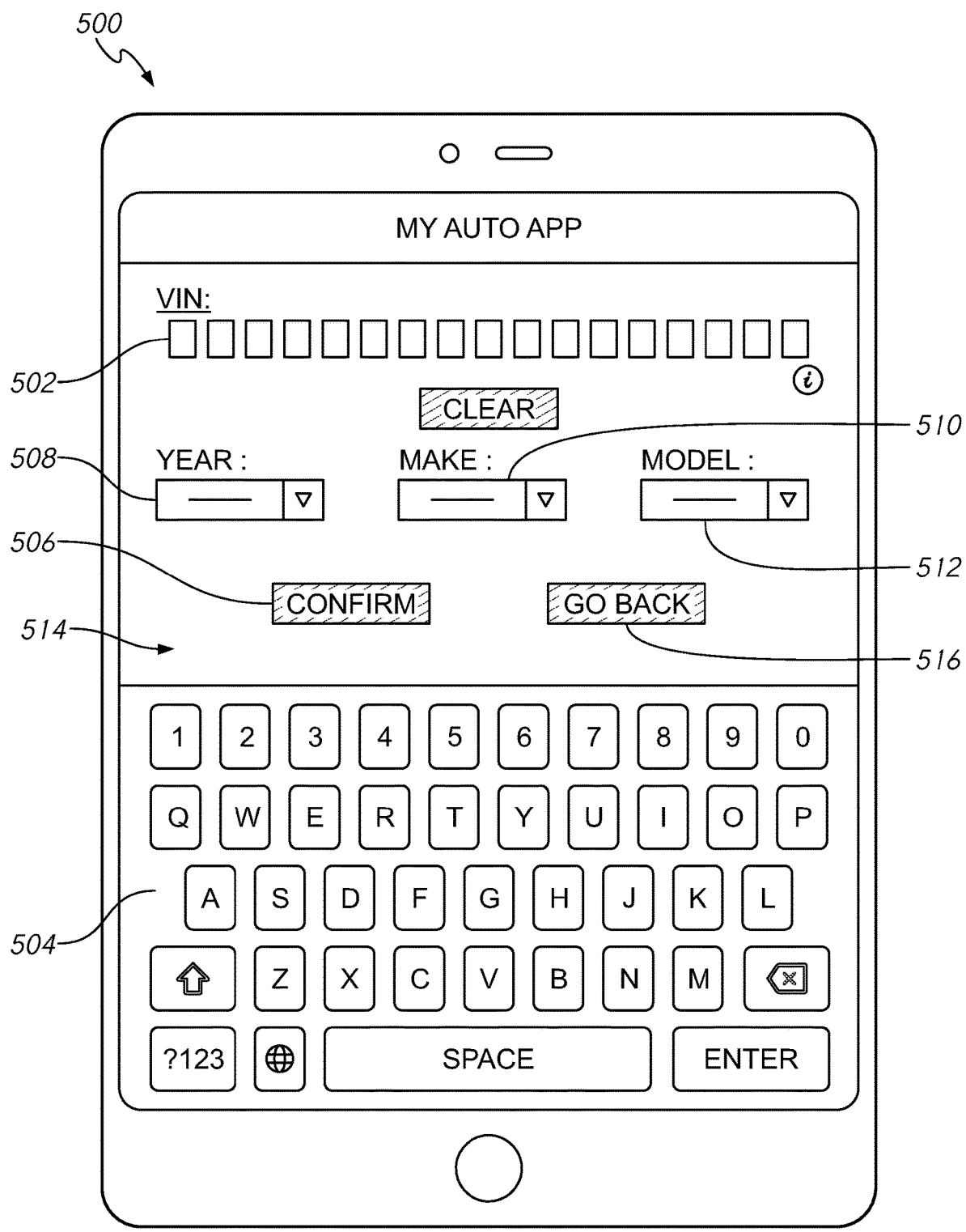
FIG. 8 is a representation of a visual display on a hand-held device for a user to enter and/or confirm a vehicle's VIN number and manufacture information.

FIG. 8 shows a representation of a visual display 500 for a hand-held device running an application according to one embodiment of the present invention. In one embodiment, the hand-held device is a smartphone. The screen 514 in the shown embodiment is a touch-screen, whereby a user interfaces with the application by physically touching the screen 514. The user may manually enter the vehicle's 17-digit VIN number 502 using an input means, which in this embodiment is a touch-keyboard 504 displayed on the screen 514. The digits of the VIN number entered by the user are displayed 502 on the screen, providing visual confirmation of the user's input.

When the user manually enters all digits of the VIN number, a check-digit, such as the ninth digit of the VIN number in one embodiment, may be used to verify that it is a valid VIN number 418.

Once a valid VIN number has been determined (140), the VIN number's digits can help determine certain manufacture information for the vehicle.

A predetermined particular digit in a valid VIN number usually designates the year when the vehicle was manufactured. This digit may be referred to as the year-digit. In a 17-digit VIN number, the tenth digit is usually the year-digit.

The year-digit refers to a predetermined mapping of 1-letter digits, each corresponding to a respective year of manufacture. Referring to FIG. 10, a table 570 shows a predetermined mapping of 1-digit characters with a corresponding year of manufacture for vehicles. In VIN number 550, for example, the tenth digit 558 is "C". From the table in FIG. 10, "2012" is the year of manufacture for a vehicle with the year-digit "C" 572.

Table 570 and the process for determining the year of manufacture from the year-digit of a vehicle's VIN number can be implemented on a computer device. In one embodiment, table 570 is stored in a data storage, with the 1-digit codes and their corresponding years of manufacture maintained as discrete data objects in the data storage. The data storage may be associated with a computer device in the computerized system. In some embodiments the computer device associated with the data storage is different from a computer device that generated a query for the year of manufacture, while in other embodiments it may be the same computer device. It is anticipated that the computer device generating the query will be the one that is running the application.

Figure 13:
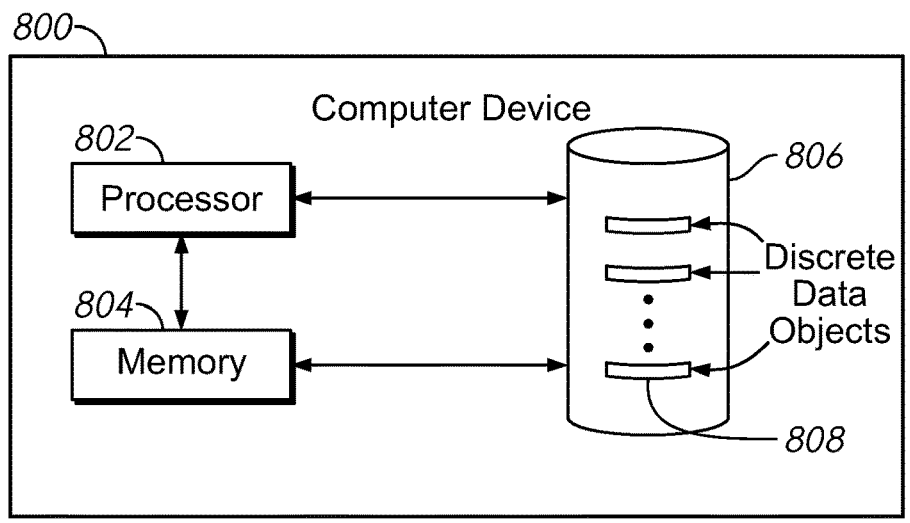
FIG. 13 shows a data storage implemented on a computer device or on a computer server.

FIG. 13 shows a data storage associated with a computer device 800. In one embodiment, computer device 800 is a server. Computer device 800 includes a processor 802 and a non-transitory computer readable medium such as a memory 804. Processor 802 and memory 804 interface with each other, as well as with a data storage means 806. Data storage means 806 may be any data storage device configurable to store data in a computer readable format, such as a database implemented on one or more hard drives, on a solid-state hard drive, or the like. Data storage means 806 comprises discrete data objects 808, which correspond to distinct items of data. In one embodiment, discrete data objects 808 comprise a one-digit character, or code, and a corresponding year of manufacture for a vehicle, such as shown in table 570 in FIG. 10. In this embodiment, memory 804 stores instructions which, upon execution by processor 802, retrieve from storage means 806 a vehicle's year of manufacture corresponding to a particular one-digit character. Such instructions would typically be executed in response to a query from an application or app running on a device that determined the vehicle's VIN number (140). That device is a part of the computerized system and is in data communication with computer device 800 if it is separate from computer device 800. The query would be based on the year-digit in the vehicle's VIN number that corresponds to the year of manufacture, which is typically the tenth digit in a 17-digit VIN number.

Other predetermined digits in a vehicle's VIN number designate the manufacturer of the vehicle. These particular digits may be referred to as the manufacturer-digits. These digits are typically the second and third digits in a 17-digit VIN number. In FIG. 9, the second and third digits 552 in VIN number 550 are "DD".

Various vehicle-manufacturers manufacture vehicles in various countries, with each manufacturer typically having one or more unique 2-digit manufacturer codes corresponding to the name, or the location, of manufacture of their vehicles. In one embodiment, a mapping of such codes with the corresponding manufacturer's details are maintained in a data storage device associated with a computer device in a computerized system. One embodiment is similar to the implementation shown in FIG. 13 and discussed above where computer device 800 has a processor 802, a memory 804, and a data storage means 806 that interface with each other. Data storage means 806 comprises discrete data objects 808. Some discrete data objects 808 comprise a 2-digit code corresponding to the name of a vehicle-manufacturer. In this embodiment, memory 804 stores instructions which, upon execution by processor 802, retrieve from data storage means 806 a vehicle manufacturer's name corresponding to a particular 2-digit code. Such instructions would typically be executed in response to a query from an application or app running on a computer device that determined the vehicle's VIN number (140). Such query would be based on predetermined digits in the vehicle's VIN number, such as the second and third digits in a 17-digit VIN number.

Some predetermined digits of a vehicle's VIN number include certain information about the vehicle, such as the vehicle's model. These digits may be referred to as the model-digits. In a 17-digit VIN number, typically the five digits in the fourth through the eighth position include certain information about the vehicle's model. In FIG. 9, the fourth through eighth digits 554 in VIN number 550 are "NG7DB".

Vehicle manufacturers usually manufacture their vehicles in various models. The different models have different engine sizes, different features in the vehicle, and the like. Vehicle manufacturers typically include information about a vehicle's model by coding it in model-digits in the VIN number of the respective vehicle. In one embodiment, the five digits in the fourth through the eighth digits of a 17-digit VIN number are the model-digits for the respective vehicle.

In one embodiment, a mapping of the 5-digit codes for various vehicle manufacturers with information about the corresponding vehicle's model information are maintained in a data storage means associated with a computer device in a computerized system of the present invention. One embodiment is similar to the implementation shown in FIG. 13 and discussed above, where computer device 800 has a processor 802, a memory 804, and a data storage means 806 that interface with each other. Data storage means 806 comprises discrete data objects 808. Some discrete data objects 808 comprise codes corresponding to the model of a vehicle. In this embodiment, memory 804 stores instructions which, upon execution by processor 802, retrieve from storage means 806 a vehicle's model information based on the particular model-code in a vehicle's VIN number, such as the five digits in the fourth through the eighth position of a vehicle's 17-digit VIN number. Such instructions would typically be executed in response to a query from an application or app running on a computer device that determined the vehicle's VIN number (140).

Data corresponding to the various codes in a VIN number may be stored in separate data storage devices, or all in one storage device, or spread across a plurality of storage devices. All such embodiments are anticipated and are deemed to be within the spirit and scope of the present invention. In one embodiment, application 66 in computer device 60 sends the queries to a computer device 72 with an associated data storage device 78, and computer device 72 determines the vehicle's year, make, or model based on the received queries, and returns the queried information to application 66 in computer device 60. In another embodiment, application 66 queries the vehicle's desired manufacture information from a third-party provider of such services, who returns the queried information to application 66.

In flowchart 400, if the vehicle's VIN number is valid 418 then the vehicle's manufacture information is queried 420 from one or more data storage means. Such data communication in computerized system 900 may occur over a local network or via a wide area network 62 such as the internet.

In one embodiment, application 66 on computer device 60 communicates a query to computer device 72 based on digits in specific positions of the 17-digit VIN number. In this embodiment, computer device 72 is owned or operated by a third party. Computer device 72 has a data storage device 78 associated with it that comprises vehicle manufacture information, such as the year, make, and model of vehicles, corresponding to predetermined codes positioned in certain digits of vehicles' VIN numbers. In response to such queries from application 66, computer device 72 responds with information comprising the vehicle's make, model, and year information that it retrieves from data storage 78. Services such as those performed by computer device 72 are commercially available from third parties on a per-query basis or on a monthly-subscription basis, with the provider providing an application programming interface (API) for helping facilitate communication and queries between a client's computer device and the service-provider's computer device. All such embodiments are anticipated and are intended to be covered by the present claims without departing from the spirit and scope of the present invention.

In flowchart 400, if the manually entered VIN number is not valid 418, the user may manually enter the vehicle's manufacture information, such as the year, make, and model of the vehicle. For instance, in the event that the manufacture information determined by the steps above is incorrect, or was unable to be determined, or if the user prefers to enter a different vehicle's information, the user may enter the vehicle manufacture information manually. In an alternate embodiment, the steps to determine the vehicle's manufacture information from a VIN label may be skipped altogether and the user may enter the vehicle's VIN number or the vehicle's manufacture information manually into the application.

FIG. 8 shows one embodiment of screen 514 where the user may manually enter a year 508, make 510, and model 512 for a vehicle. In one embodiment, the year 508, make 510, and model 512 are drop-down menus that include a pre-populated list of years, vehicle makes, and corresponding vehicle models. Such information may be stored in a data storage and retrieved by the application, or it may be stored in the application whereby it can be pre-populated into these lists. The user may selectively choose a desired option from the list in each drop-down menu. In alternate embodiments, the user can manually enter such information using an input means, such as with keyboard 504.

In flowchart 400, if the VIN number manually input by the user is not a valid VIN number 418, then the user may enter the vehicle's desired manufacture information manually as described above. In this embodiment, if the user does not correctly enter the vehicle's manufacture information, i.e. year, make and model 422, in a timely manner then the user is prompted to again enter the vehicle's correct VIN number 416, followed by the subsequent steps to verify the validity of the VIN number 418, etc, as discussed above. On the other hand, if the user enters the vehicle's manufacture information correctly, then the process for determining the vehicle's manufacture information (150) is complete.

After determining the vehicle's manufacture information (150), the manufacture information may be displayed to the user 424. In one embodiment, the determined manufacture information (150), comprising the vehicle's year 508, make 510, and model 512, is displayed visually on screen 514. If the user desires, he may selectively change the vehicle manufacture information; such as by manually entering new information via keyboard 504 or by touching the drop-down menus for year 508, make 510, and model 512, and selecting different values.

In one embodiment, when the manufacture information displayed on the screen is the desired information, the user may confirm 426 with a CONFIRM button 506. Alternatively, the user may choose to go back with a GO BACK button 516 and repeat the previous steps of determining the vehicle's VIN number, etc.

Figure 11:
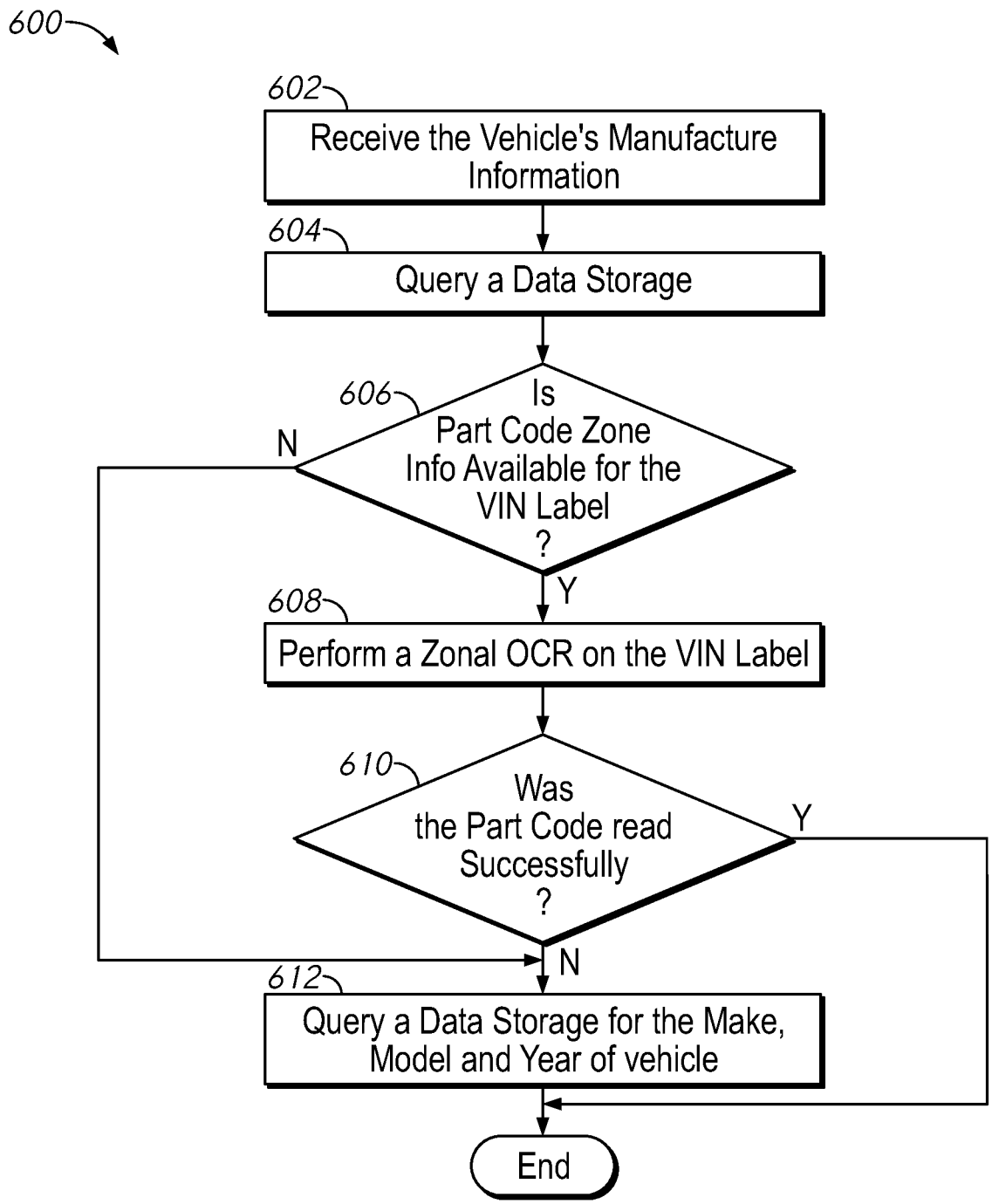
FIG. 11 is a flowchart of one embodiment of a method to query OEM parts, or part numbers, for a vehicle based on the vehicle's manufacture information.

After the vehicle's manufacture information has been determined (150), an OEM code for a part in the vehicle may be determined (160). FIG. 11 shows a flowchart 600 of one embodiment of a process to determine a vehicle's OEM part code based on the vehicle's manufacture information. In one embodiment, application 66 in computer device 60 receives the vehicle's manufacture information 602. Application 66 then submits a query to a data storage associated with a computer device in computerized system 900. The query is based on the vehicle's manufacture information. In one embodiment, the query is submitted to the same computer device as for a previous query, such as queries for the vehicle's year, make, or model, while in other embodiments this query may be submitted to a different computer device with a different data storage. It is anticipated that in an alternate embodiment a data storage may be associated directly with computer device 60 and the query would be performed on that data storage and no data communication outside computer device 60 would be necessary.

Figure 12:
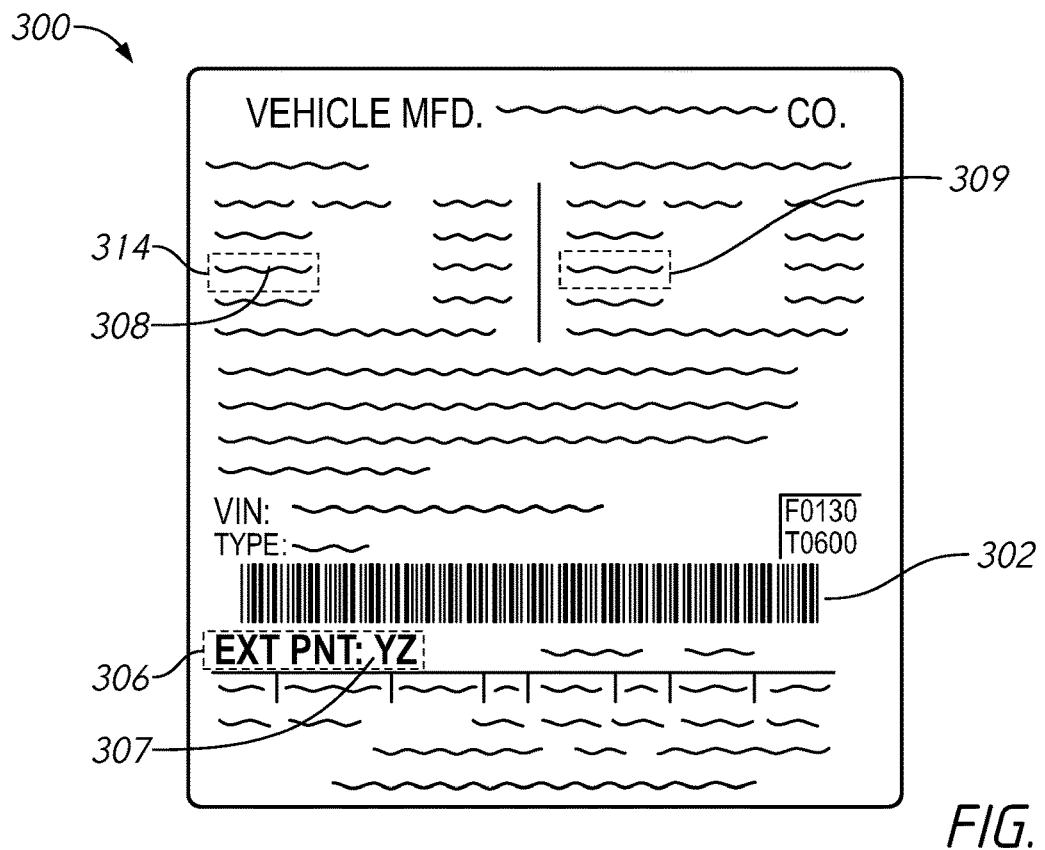
FIG. 12 is the VIN label of FIG. 6 with an OEM code provided in a particular zone on the VIN label.

VIN labels usually include some OEM codes on them. For example, FIG. 12 shows VIN label 300 with the vehicle's OEM paint code 307 and the vehicle's OEM tire code 308 on it. Other VIN labels may include OEM part information for the same parts, for alternate parts such as aftermarket parts, of for the same parts and additional parts. All such embodiments are anticipated.

The vehicle's OEM paint code 307, for example, is located in a predetermined zone 306, which is identified in FIG. 12 for illustrative purposes. Similarly, the vehicle's OEM tire code 308 is located in a predetermined zone 314, which is identified in FIG. 12 for illustrative purposes. In this VIN label, paint code zone 306 reads "EXT PNT: YZ", which indicates that the OEM code for the vehicle's 'exterior paint' is: 'YZ'. Similarly, tire code zone 314 reads "P275/55R20", which indicates that the OEM code for the vehicle's tires is: 'P275 55R20.'

VIN label 300 shown in FIGS. 6 and 12 includes two different OEM tire sizes. One tire size is for the front tires 308, and the other tire size is for the rear tires 309. In the embodiment shown, both the front tire size 308 and the rear tire size 309 are the same, although in other embodiments this might not be the case. It is anticipated that some VIN labels may provide one OEM code for all tires for the respective vehicle, while other VIN labels may provide separate OEM codes for the vehicle's front tires versus its rear tires. The different sets of tires are treated as different OEM part codes, with a respective OEM part code for each, even if certain vehicles have the same OEM tire code for its front tires and for its rear tires. These separate OEM part codes may be stored in a data storage, and queried from it, similarly as the other OEM part codes in accordance with the teachings of the present invention.

Although some VIN labels have certain OEM part codes on them, different vehicle-manufacturers place this information at different locations on their respective VIN labels. Accordingly, a particular OEM part code for a vehicle cannot be determined by scanning or reading the same area of VIN labels for every vehicle.

Typically, vehicle manufacturers place the paint code information at the same location on each of the VIN labels for all of the vehicles that the respective vehicle-manufacturer manufactures. For example, VIN label 300 in FIG. 6 and FIG. 12 is for a vehicle manufactured by Ford Motor Company. Accordingly, vehicles manufactured by Ford Motor Company generally have their paint code imprinted in the same location on their VIN labels as the paint code zone 306 on VIN label 300.

The particular parameters of the OEM paint code zone 306, i.e. the area comprising the paint code on VIN label 300, can be predetermined with respect to the overall parameters of VIN label 300. Similarly, the particular parameters, i.e. the location, of OEM paint code zones on every vehicle manufacturer's VIN labels can be predetermined with respect to the overall parameters of their respective VIN labels. A database of this predetermined OEM paint code zone information for various vehicle manufacturers is maintained in a data storage system. That data storage system can be associated with a computer device in a computerized system, whereby the contents of the data storage can be queried by the application.

Similarly as for the paint code zone, the particular parameters, i.e. the location, of OEM part code zones for other OEM parts on every vehicle manufacturer's VIN labels, can be predetermined with respect to the overall parameters of their respective VIN labels. This information can be similarly maintained in a data storage system associated with a computer device in a computerized system, whereby the contents of the data storage can be queried by the application. All such embodiments of the present invention, therefore, are consistent with the teachings of the present invention.

Figure 14:
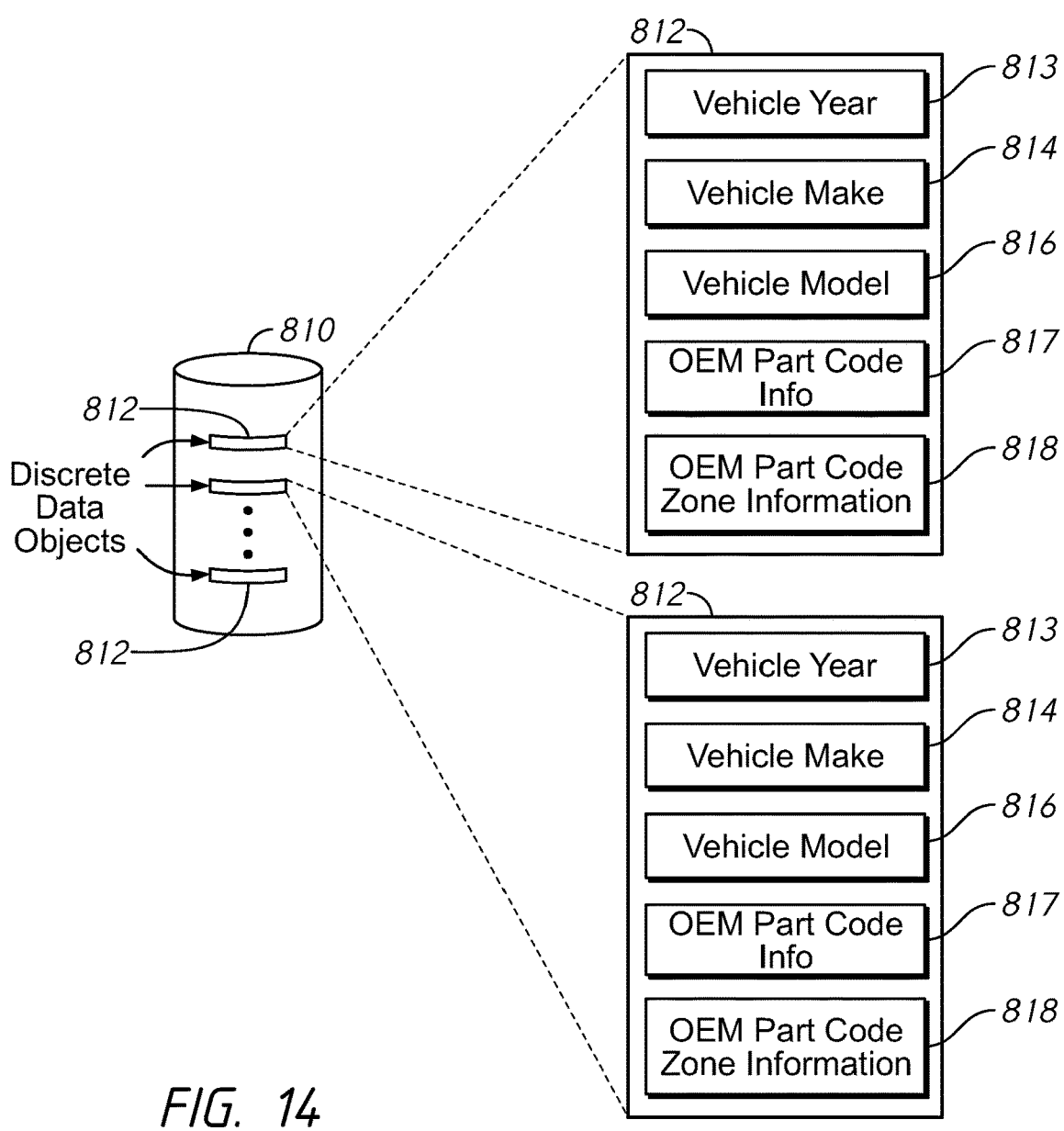
FIG. 14 shows a data storage system with zone information for OEM codes or part numbers that are included on particular VIN labels.

FIG. 14 shows an exemplary data storage system 810 with OEM part code Zone information for various vehicle manufacturers. Data storage system 810 is associated with a computer device in a computerized system, and in one embodiment receives queries from application 66. The computer device associated with data storage system 810 may be computer device 60, or any other computer device, apparatus, or the like, in its associated computerized system. Data storage system 810 comprises discrete data objects 812.

In one embodiment, data storage system 810 comprises a separate data object 812 for each vehicle manufacturer. In an alternate embodiment, data storage system 810 comprises a separate data object 812 for each OEM part that is provided on the VIN labels of each vehicle manufacturer.

Data objects 812 comprise information pertaining to vehicle manufacturers and OEM part code zone information for their respective VIN labels. In the preferred embodiment, for each OEM part code information 817 that is included in the respective vehicle-manufacturer's VIN labels, a separate data object 812 exists in the data storage system 810. Such OEM part code information 817 typically includes at least the OEM paint code for the respective vehicle and the OEM tire size for the respective vehicle. It is anticipated that certain vehicle manufacturers may also include other OEM part information on their respective VIN labels.

OEM part zone information 818 in each data object 812 comprises the parameters of the respective OEM part code zone on the corresponding VIN label. The parameters of the OEM part code zone information 818 are determined with respect to the corresponding VIN label's overall parameters. In one embodiment, data objects 812 include the year 813, the make 814, the model 816, and the OEM part code zone information 818 for a particular year, make, and model of the respective vehicle.

OEM part code zone information 818 will usually remain consistent for all models of a particular make, or manufacturer, of vehicles. However, it is anticipated that certain makes or manufacturers of vehicles may have OEM part code zones that vary between their various models of vehicles. It is preferable that each data object 812 include OEM part code zone information 818 for each year 813 and model 816 of vehicles for every make 814 or manufacturer of vehicles. However, an alternate embodiment may exclude certain information, such as the year 813 or model 816 information, from data objects 812 and comprise only the OEM part code zone information 818 by the make 814 or manufacturer of vehicles.

In certain instances, a vehicle manufacturer, or a particular model for a particular make of vehicle, will not include a certain OEM part code on their VIN labels, such as the tire size. In such instances, no OEM code zone will exist on the VIN label for the respective OEM part code. That fact will be indicated by the OEM part code zone information 818 in the data object 812 for that particular OEM part code for that particular year, make, and model of vehicle. This may be by, for example, having a null indicator or a particular code such as NONE for the respective OEM part code zone information 818. Such null indicator or particular code will tell the querying application that no OEM part code zone exists for that particular OEM part on the VIN label that is being queried.

In response to a query 604 for data storage system 810, OEM part code zone information 818 for the particular make and model of vehicle is returned to the querying application or computer device, which is application 66 on computer device 60 in one embodiment. If data storage system 810 includes any OEM part code zone information 818 for the particular VIN label 606, the OEM part code zone information 818 is returned and is received by application 66.

A zonal optical character recognition (ZOCR) procedure is then performed on the VIN label 608. A ZOCR is an optical recognition procedure known in the art that reads characters located in a specific predetermined zone, or geographical area, of a document, or label, or the like. In one embodiment, the ZOCR procedure is performed specifically on the OEM part code zones on the VIN label to extract the specific OEM part code information located in the respective OEM part code zone. The ZOCR procedure is performed by application 66 on computer device 60 in one embodiment. In another embodiment, the VIN label data and the OEM part code zone information are communicated to another computer device, and the ZOCR procedure is performed 608 by that computer device. The ZOCR procedure thus determines the OEM part code information located in each of the OEM part code zones of the VIN label.

On the other hand, if a null indicator or a code such as NONE is returned to indicate that either no OEM part code zone information exists on that VIN label or that the OEM part code zone information is not available from data storage system 810 for that particular make or model of vehicle, then no ZOCR procedure needs to be performed on the VIN label.

In one embodiment, application 66 requests the ZOCR procedure 608 with only those portions of the VIN label that comprise OEM part code zones. Sending only a part of the VIN label instead of the whole VIN label can expedite processing time, thereby improving latency and performance of the overall system. This smaller portion of the VIN label can be determined based on the OEM part code zone's parameters that were determined.

The ZOCR procedure 608 extracts the characters that comprise an OEM part code for the vehicle. Accordingly, if one or more OEM part codes are read successfully by the ZOCR procedure 608, then those particular OEM part codes for the vehicle are determined (160) for the purposes of the present invention. For example, in VIN label 300, the OEM paint code 307 and the OEM tire size 308 may be determined from a ZOCR procedure. In one embodiment, a list of the OEM parts determined in such manner may be displayed to the user, and the user may selectively choose one or more of those OEM parts and proceed with purchasing them.

In alternate embodiments, the OEM part information on a VIN label may be determined directly from a ZOCR procedure on a VIN label. This ZOCR procedure will typically depend on predetermined information that is known about the particular OEM part, which will help the ZOCR procedure recognize the specific OEM part number on the VIN label. For example, tire sizes are usually a three-digit number, followed by a two-digit number, which is followed by a two-digit number. The format of these numbers for the tire size on VIN label 300 in FIG. 6 is "P275/55R20". The key digits for purposes of determining the OEM tire size for the vehicle are the three numbers "275," followed by the two numbers "55," and the two numbers "20" following it. The ZOCR procedure can be customized to recognize the numerical pattern corresponding to tire sizes, and thus determine the correct OEM part number for the tires for the vehicle.

Similarly, if the OEM part number for the vehicle's front tires is separate from the OEM part number for the vehicle's rear tires, the ZOCR procedure can distinguish between the two, such as by recognizing the word "front" or "rear" corresponding to each tire size.

On the other hand, if the ZOCR procedure 608 fails to read OEM part codes on the VIN label successfully 610, or if OEM part code zone information is not available for the particular VIN label 606, then the OEM part codes for the vehicle may be determined by querying a data storage 612. The query is based on the vehicle's manufacture information. Such query is preferably designed to retrieve a categorized list of a plurality of OEM parts for the vehicle 612.

Figure 15:
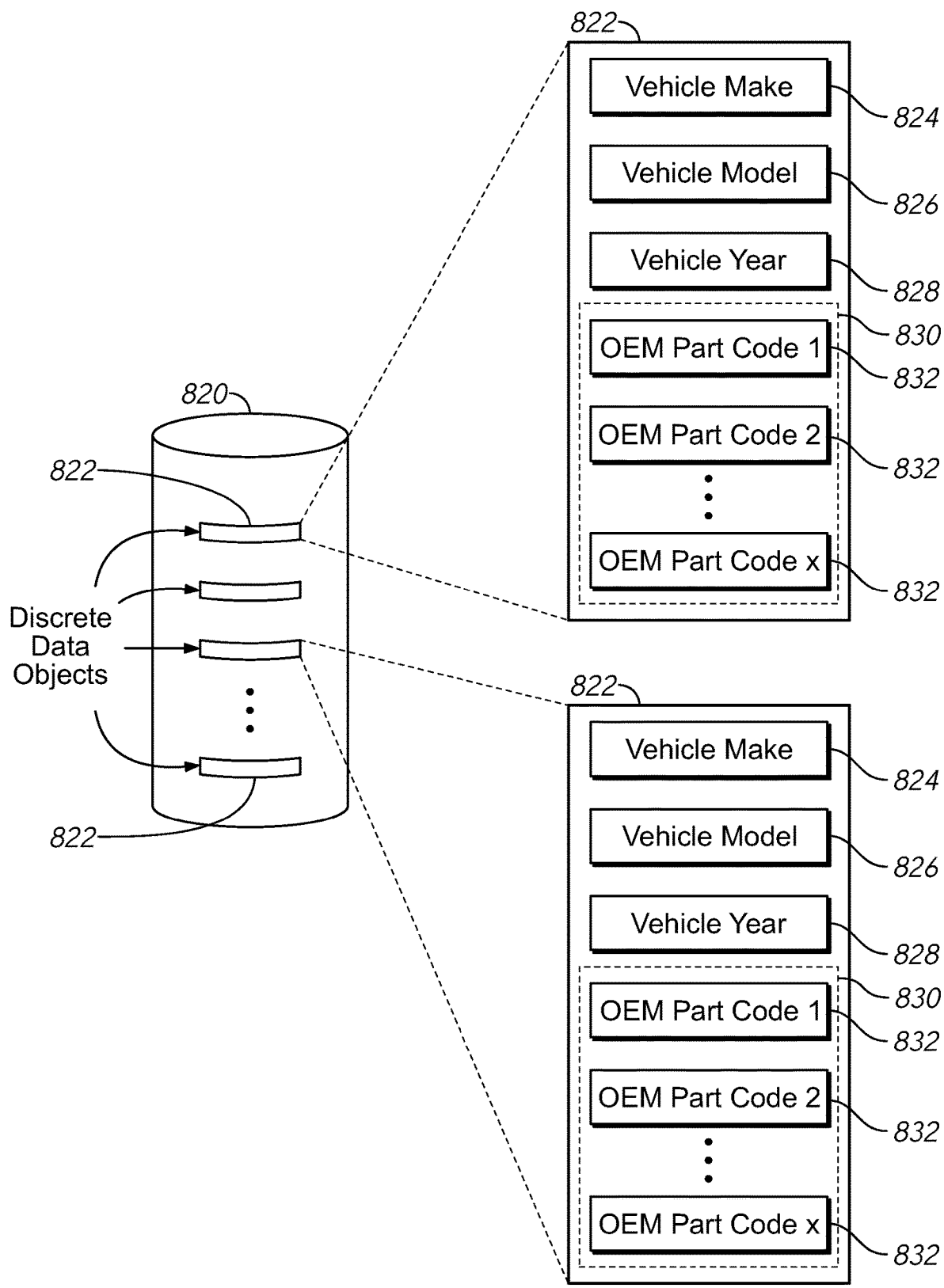
FIG. 15 shows a data storage system with OEM codes or parts information corresponding to certain vehicles.

OEM part code information for a year, make, and model of a vehicle is public information that is generally available. In one embodiment, a database of vehicle OEM part information for vehicles, organized by vehicles' year, make, and model, is maintained in a data storage. FIG. 15 shows an exemplary data storage system 820 with OEM part codes for vehicles stored therein. In one embodiment, data storage system 820 is associated with a computer device in computerized system 900, which computer device receives queries from application 66 on computer device 60. Data storage system 820 comprises discrete data objects 822. In one embodiment, data storage system 820 includes a separate data object 822 for the different years, makes, and models of vehicles that have been sold commercially.

Each data object 822 pertains to a specific make and model of a vehicle that was manufactured in a particular year. In one embodiment, each data object 822 comprises the make 824, the model 826, and the year 828 of a vehicle, and a list 830 of OEM part codes 832 pertaining to that particular vehicle. Preferably, the list of OEM part codes 830 comprises all of the OEM part codes associated with that particular year 828, make 824, and model 826 of vehicle, although it is anticipated that the list of OEM part codes 830 may not include every OEM part code for the respective vehicle. In one embodiment, each OEM part code in the list of OEM part codes 830 also includes a name, a picture, and a short description for the corresponding OEM part code 832.

Figure 19:
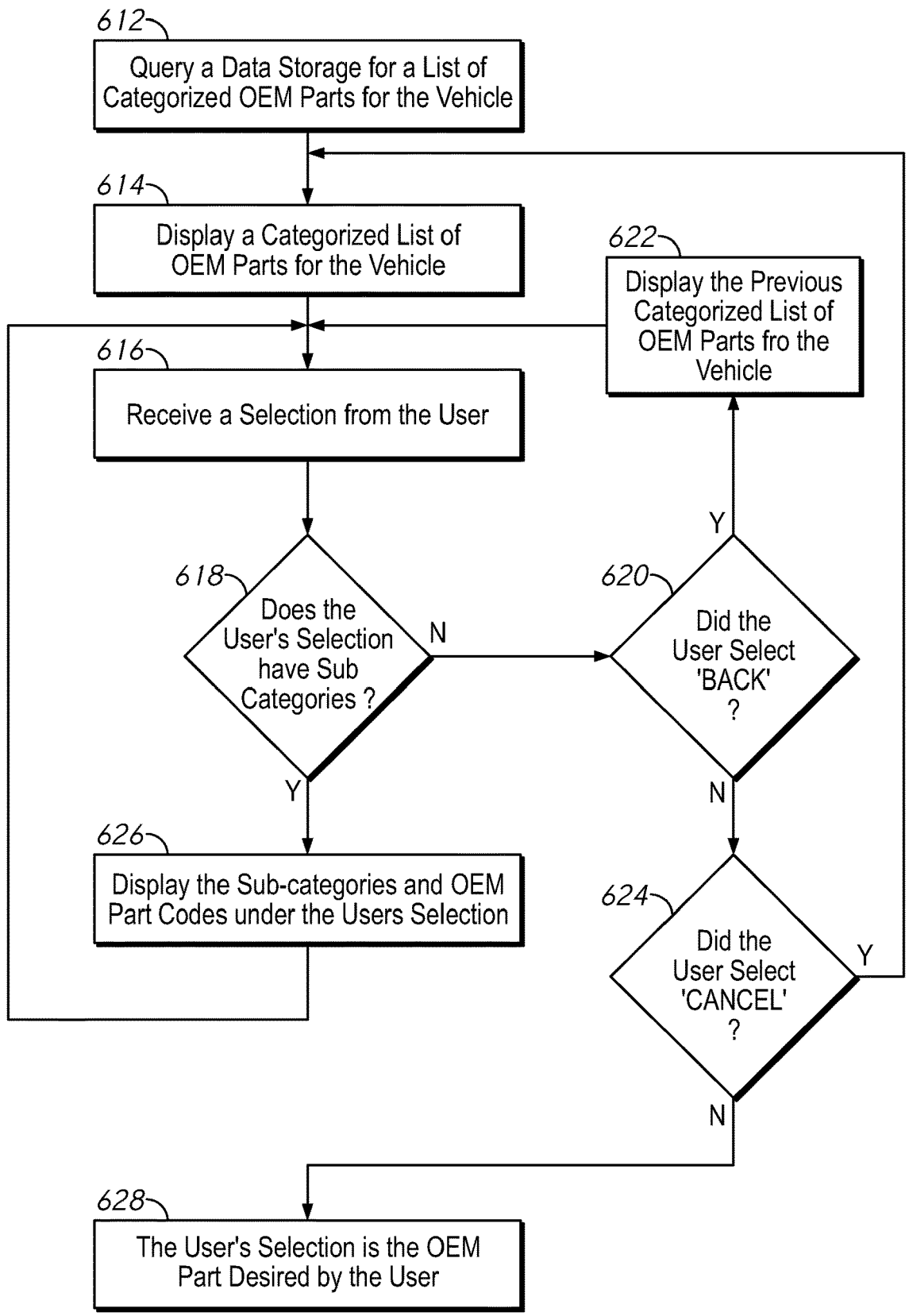
FIG. 19 is a flowchart that shows one embodiment of a method to determine a desired part for a particular vehicle.

FIG. 19 shows a flowchart of one embodiment of a method to determine an OEM part desired by a user for a particular vehicle. In response to a query 612, data storage device 820 returns a list of OEM part codes 832 for the particular year 828, make 824, and model 826 of vehicle to the querying application and computer device, which are application 66 and computer device 60 in one embodiment. The list of OEM part codes 832 returned by data storage device 820 is preferably categorized according to a predetermined organization scheme. It is anticipated that such organization scheme may be any organizational scheme designed to organize the various parts for a vehicle, and will vary by embodiment. In one embodiment, the list of parts is organized by the following categories:

Battery
Brakes
Body
Bulbs
Cables/wires
Cooling System
Engine
Fluids
Glass
Paint
Radiator
Paint
Tires
Suspension/Mechanical The categories are displayed to the user 614 via the application. The categories are preferably displayed in alphabetical order, but it is anticipated that the categories may be presented in any order.

After the categories are displayed to the user 614, the user may select one of the categories. The user's selection is received 616 by the application.

In alternate embodiments, it is anticipated that the user's selected category may have further sub-categories 618. As an example, the category 'Body' may have the following sub-categories, and in certain instances, a sub-category may have further sub-categories, and so on:

---

Body
  Roof
  Front Hood
  Rear Trunk
  Panels
    Door Panels
      Driver's side door panel
      Passenger's side door panel
      Driver's side rear door panel
      Passenger's side rear door panel
    Side Panels
      Front right fender panel
      Front left fender panel
      Rear right quarter panel
      Rear left quarter panel
  Bumpers
    Front Bumper
    Rear Bumper

---

In one embodiment, the user may be provided a BACK button, which the user may select 620 to return to the previous category. This may be, for example, because the user mistakenly selected the wrong category, or because the user's desired OEM part does not appear to be included in the displayed list of OEM parts or sub-categories. In such event, the previous categorized list of OEM parts 622 for the respective vehicle is displayed to the user, and the user may make another selection 616.

In one embodiment, the user may be provided a CANCEL button, which the user may select 624 to return to the original categorized list of OEM parts 614. This may be, for example, because the user mistakenly selected a wrong category, or because the user prefers to start over. In such event, the initial categorized list of OEM parts 614 for the respective vehicle is displayed to the user, and the user may make another selection 616.

In the event that the user's selection has sub-categories 618 under it, then a list of the sub-categories and OEM part codes under the user's selection are displayed 626. This displayed list allows the user to make another selection, which is received 616 and processed as described for steps 618-626 above.

Alternatively, if the user's selection does not have sub-categories 618 under it, then the user's selection is the OEM part desired by the user 628.

Figure 20:
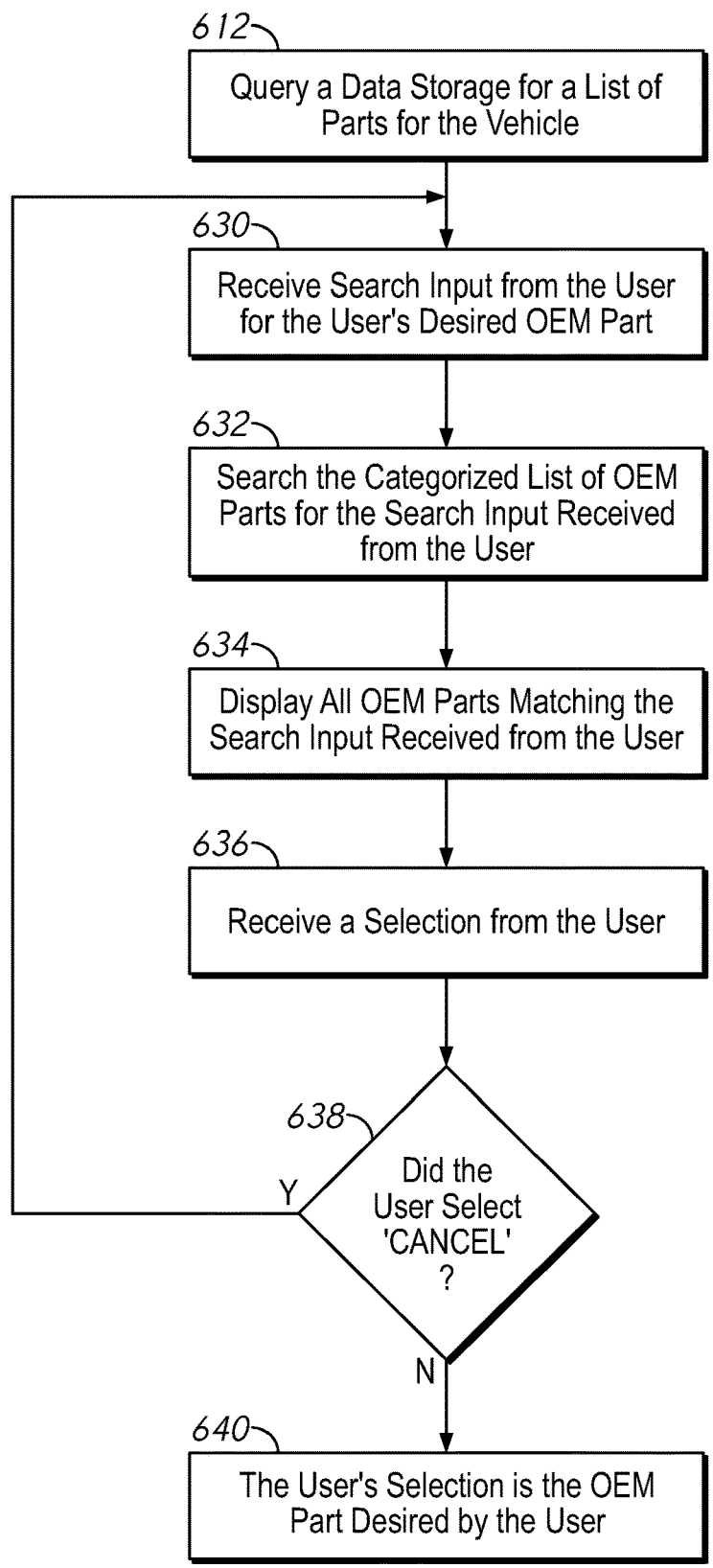
FIG. 20 is a flowchart of one embodiment of a method to determine a desired part for a particular vehicle, which is based on a search performed by the user.

FIG. 20 is a flowchart of an alternate embodiment of a method to determine an OEM part desired by a user for a particular vehicle based on a search performed by the user. After a query to retrieve a categorized list of OEM parts for the vehicle 612, a user may perform a search by entering one or more specific key words, or search criteria, for the particular OEM part desired by the user. The user may provide this input via a keyboard, for example. Key words used by a user may include, for example, "tire," "windshield," "spark plug," etc.

The user's input of the user's desired search criterion is received 630 by the application. Based on that input from the user, such as keywords, a search is performed 632 on the categorized list of OEM parts for the respective vehicle, which list was previously retrieved. Such search may be a simple text search, a database query based on key words in the user's input, or the like. Methods and software for performing such data searches are known in the art.

The results of the search 632 are displayed to the user 634. The displayed results may be categories of OEM parts for the respective vehicle, or a list of OEM parts for the respective vehicle, or a combination thereof. In one embodiment, the user may selectively maneuver through the categories, look at sub-categories and OEM parts in a category, or have certain other browsing capabilities. In another embodiment the user may explore through more details about a certain OEM part. In one embodiment, the search results 632 comprise a combination of OEM parts categories and OEM parts, whereby the user may selectively perform one or more of the functions described above.

In one embodiment, the user may have an option to select a CANCEL button. When the user's selection is received 636, if the selection is the CANCEL button 638, then the user may be returned to the previous search screen where he may enter another search criterion 630 to perform a different search. On the other hand, if the user's input is not the CANCEL option 638, then the user's selection is an OEM part, which is likely the OEM part desired by the user 640.

In one embodiment, the user's selection 636 corresponds to a category of OEM parts. In such embodiment, the OEM parts and sub-categories under that category are displayed to the user. The user can then make another selection 636, which selection may be CANCEL, or an OEM part, or another category of OEM parts, whereby the steps described above may be repeated.

When OEM parts are displayed to the user, in the preferred embodiment each OEM part's name, picture, and a short description for each respective part are also displayed. Alternatively, the user may select an OEM part from the list displayed, and a separate screen or window may display the name, picture, and short description of the respective part. As previously discussed, this information is stored in data storage 820 and is part of the respective discrete data object 822. Such details of the respective OEM part are designed for the purpose of assisting the user better understand and select the proper OEM part he desires. Towards this goal, any pertinent information or details about the respective OEM part are anticipated to be included in the respective discrete data object 822 to help serve the user's purposes.

In an alternate embodiment, the user is provided the ability to selectively explore certain details about the respective OEM part selected by the user. Or the user is provided the ability to selectively explore all additional details that are available for the OEM part. It is anticipated that in one embodiment all such additional information may be stored in data storage 820 and is part of the respective discrete data object 822. In alternate embodiments, such information may be stored separately, either in data storage 820 or in a separate data storage, or may even be retrieved from the results of a search, such as a search performed by a search engine over the internet.

Once the correct OEM part number has been determined, a number for a corresponding non-OEM part, or an aftermarket part, may also be determined. Aftermarket parts are designed to serve as a valid substitute for their corresponding OEM part. However, aftermarket parts tend to be cheaper in cost as compared to their corresponding OEM part, which some customers may prefer. Those skilled in the art are aware that mappings for OEM parts to their corresponding aftermarket parts are well known in the art, and are publicly available information. A query to determine the correct aftermarket part that corresponds to an OEM part may be accomplished in any number of ways known in the art and via any number of publicly available sources for such information or data. Accordingly, a user may be provided options for purchasing or installation for the OEM part, for the aftermarket part, or for both. All such embodiments are anticipated, and are therefore intended to be covered by the instant claims. Further, both OEM parts and their corresponding aftermarket part are included in references to parts in the present disclosure.

Figure 16:
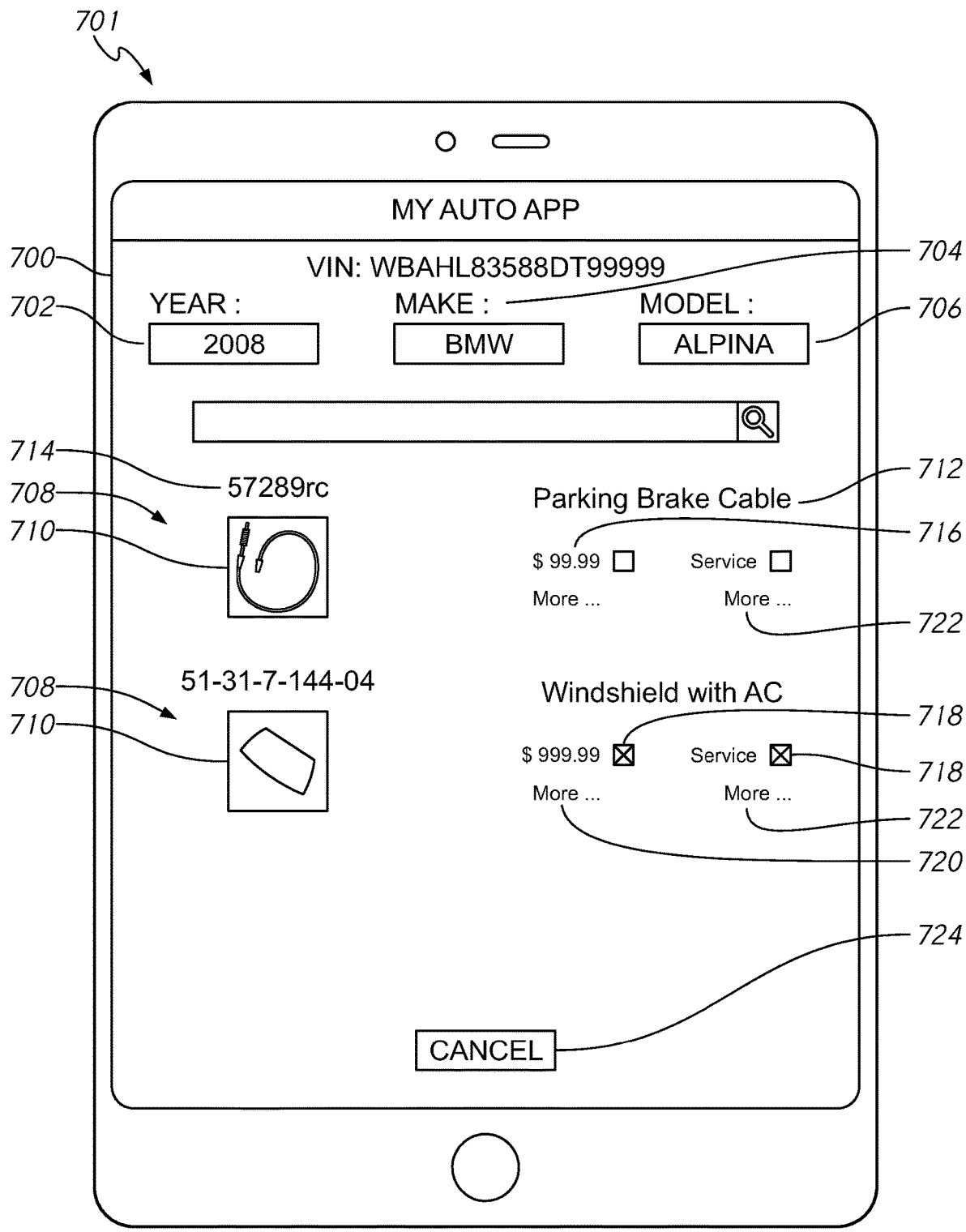
FIG. 16 shows one embodiment of a visual display on a hand-held device for a user for the purpose of viewing and purchasing desired parts and installation services for a particular year, make, and model of vehicle.

After the parts desired by the user have been determined, the user is provided an option to purchase the parts through the app (170). FIG. 16 shows a screen 700 on a hand-held device 701 for a user to view the parts that the user has selected for the respective year, make, and model of vehicle. In one embodiment, hand-held device 701 is a smartphone. In the example shown in FIG. 16, the vehicle's year 702 is 2008, its make 704 is BMW, and its model 706 is ALPINA. Two OEM parts 708 are shown selected by the user for this vehicle. In the preferred embodiment, a visual representation 710 for each OEM part is shown along with the OEM parts name 712. The user may select the parts he wishes to purchase, or have installed, from this list.

In an alternate embodiment, application 66 on computer device 60 displays the selected parts on a display associated with computer device 60, allowing the user to select the ones he desires to purchase, by selectively operating the interface 74.

When the parts 614 needed for the respective vehicle are determined, their respective part codes will be known from the prior query when parts information was retrieved for the vehicle. In one embodiment, the respective part codes are displayed 714 to the user on the same screen. In an alternate embodiment, the user may selectively choose an option corresponding to a selected part in order for the application to display its part code.

In one embodiment, the user may select corresponding check boxes, radio buttons, or the like, 718 to select the purchase, or the installation, or both, of the desired parts. In one embodiment, the application highlights the parts selected by the user either for purchase or for installation, or for both, in order to visually confirm the user's selection.

In the preferred embodiment, a price 716 corresponding to each selected part is also displayed. The displayed price 716 will usually be a quote for the user to purchase the respective part through the application. In other embodiments, the displayed price 716 is the manufacturer's recommended retail price, or a known retail price, for the respective part.

In an alternate embodiment, the price 716 will correspond to a specific vendor who sells that part. The user may view additional information by selecting an option corresponding to that price, such as by selecting the price itself. In another embodiment, the user may have an option to purchase the part from a different vendor, or from a different source. In such embodiment the user may select an option 720 corresponding to the part to view different purchasing options available for that part. Such price options may also include information, reviews, shipping charges, and the like, about each available vendor or source, which the user may selectively view. It is anticipated that each of the available price options are selectable by the user to purchase the respective part from that particular vendor or source.

In one embodiment, the user is also provided an option to have a professional install the respective part in his vehicle (170). This option is preferably displayed next to the respective part's name or part code. The user is preferably provided a plurality of alternatives for professional installation of the part in the vehicle. In one embodiment, the professional will travel to the user's location to install the part in the user's vehicle. However, it is anticipated that in alternate embodiments the user will have the option of selecting a professional installer where the user will take the vehicle to the professional installer's location to have the part installed.

In such embodiment, the user may select an option 722 corresponding to the part to view the professional installation options available for that part. Such professional installation options preferably include additional information, such as the cost, information, reviews, schedule availability, location, and the like, about the different available professional installers, which the user may selectively view. The professional installation options are preferably selectable by the user to purchase the respective professional installation service.

In one embodiment, the list of professional installers is stored in a data storage that is accessible by the application. In another embodiment, the list of professional installers is maintained by the application. But it in either embodiment, it is anticipated that the list will be modifiable to add, delete, and change information pertaining to the professional installers.

The list of professional installers is preferably categorized by the various types of parts in a vehicle. Each professional installer has a list of parts, or categories of parts, that they are qualified to install in vehicles. When a user selects installation for a particular part, the professional installers qualified to install that part, or the category of that part, are provided as options to the user. The data storage includes additional details about each professional installer, such as their charges for installing the particular part at issue, which information is selectively available to the user whereby the user can selectively choose to view it.

In another embodiment, the data storage includes details of a geographical territory, or area, within which the respective professional installer, or repair facility, performs its part-installation services. In this embodiment, only the professional installers who install the respective part in the geographical area encompassing the users physical location will be provided to the user as an option for purchasing professional installation services. The users physical location may be determined by any means known in the art, such as by the user's current GPS location, by requiring the user to input his address, or the like.

In one embodiment, the list of professional installers is a predetermined fixed list. The predetermined list includes each professional installer's respective information, and the information in the list is maintained by a person or an entity associated with the application's administration and operations. Modifications to the list may be processed only through that person or entity.

In another embodiment, the list of professional installers is a running list that is updated on an as-needed basis. In one embodiment, the list is modifiable in real time, whereby updated information is reflected in real time as the application is used and operated by users. It is anticipated that the running list in this embodiment will be modified regularly and the respective information about each of the various professional installers will be current. In one embodiment, the professional installer has the ability to modify his own information, or at least certain predetermined items of his own information. Various methods are known in the art for allowing users, such as the professional installers, to have the ability to securely edit, add, or delete their respective information. In alternate embodiments, the users may also have the ability to track wanted repairs within a certain radius around a given location.

In one embodiment, the application includes a feature whereby a person or entity offering professional installation services may create an account for themselves for the purposes of offering professional installation services of parts in a vehicle. One skilled in the art will appreciate that virtually anyone having access to the application, whether an individual, an automotive repair business, a company, or the like, may create an account for the purposes of offering parts installation services. In one embodiment, an application process is involved, whereby a newly created account is vetted for the purposes of qualifying the account for providing parts installation services through the application. The application process and the vetting process will vary by embodiment, and is expected to typically depend on the applicant's prior experience, education, and knowledge pertaining to the installation of parts in vehicles, or pertaining to performing repairs on vehicles. All variations to the application and vetting process are, therefore, anticipated and are intended to be covered by the present claims.

In one embodiment, a customer-ratings and a customer-review feature is associated with each installation or repair services provider. Or alternative embodiment, users may be provided a link to a third party customer-rating or customer-review website that allows users to rate or review a provider of goods or services. This feature is designed to allow customers to rate and review their experience with their particular parts-installation services provider. The application maintains a running ratings and reviews record of each parts-installation services provider, and such record is made available to customers. Such record provides an overview of the performance history of the respective installation or repair services provider, which can assist the future customers' selection process for a professional parts-installation or repair services provider. Further, the application may use this information to evaluate the quality of the services that were provided by the respective installation or repair services provider, which may be used for the purposes of qualifying or disqualifying a particular provider with respect to providing future parts installation or repair services through the application.

Referring to FIG. 16, the screen 700 preferably provides the user an option to cancel and revert back to the previous screen in order to select a different vehicle and choose OEM parts, or aftermarket parts, for that vehicle. In one embodiment, a CANCEL button 724 is provided, which the user may selectively choose for returning to the previous screen and selecting a different vehicle.

Figure 17:
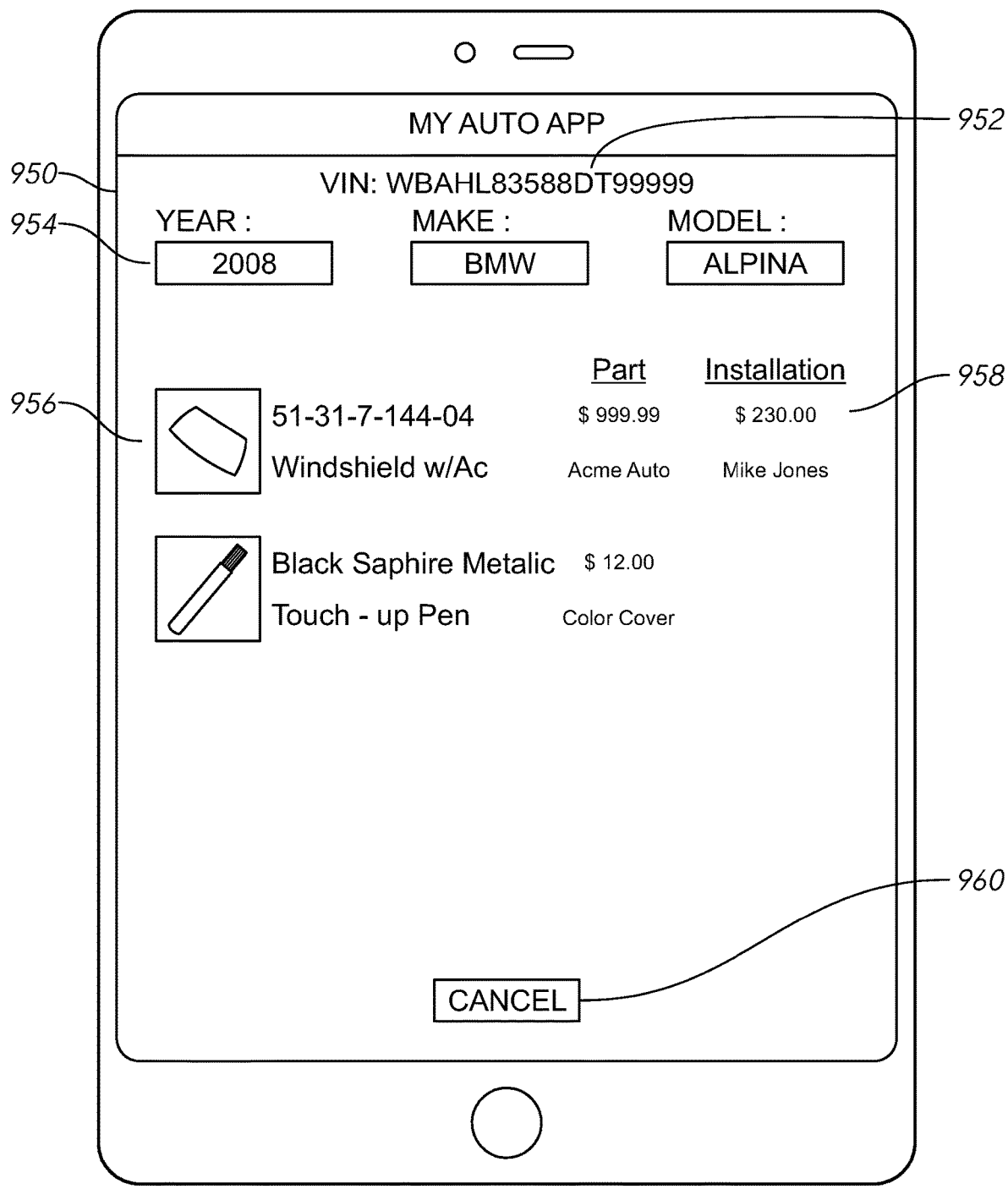
FIG. 17 shows a visual display on a hand-held device for a user to selectively purchase parts for a vehicle and to order installation thereof.

FIG. 17 shows a visual display 950 from an application or an app confirming the users selected options to purchase particular parts and parts-installation services. Because the user has the option of purchasing only the part, only installation services for the part, or only repair services, or a combination thereof, this screen helps serve as a confirmation of the user's desired selection of parts and services for purchase. The display 950 preferably shows the vehicle's VIN 952 and its year, make, and model 954.

In one embodiment, each part's details are displayed 956 on display 950 for visual confirmation. In one embodiment, these include a picture, the part's code, the part's name, and a short description of the part. Each part's details 956 also show the users selections 958 for purchase. As an illustrative example in the embodiment shown in FIG. 17, the user is opting to purchase both the part and its installation for a "Windshield w/ AC," and only the part for a "Touch-up Pen."

In one embodiment, the user may also choose to buy products for the OEM paint color of the vehicle, such as a touch-up pen, touch-up liquid, and apparatus to conceal damage in the vehicle's paint. In one embodiment, the user may choose to purchase apparatus matching the vehicle's OEM paint color for the purposes of concealing damage in the vehicle's paint 956, which is the same apparatus as disclosed in U.S. Pat. No. 9,993,994. That patent teaches an apparatus having two sides with adhesive on one side and a color on another side, where the color precisely matches the specific OEM paint color of the vehicle.

The screen preferably provides the user an option to cancel and return to the previous screen in order to reselect his purchase options. In one embodiment, a CANCEL button 960 is provided for that purpose, which the user may selectively choose in order to return to the previous screen and modify his purchase selections.

Figure 18:
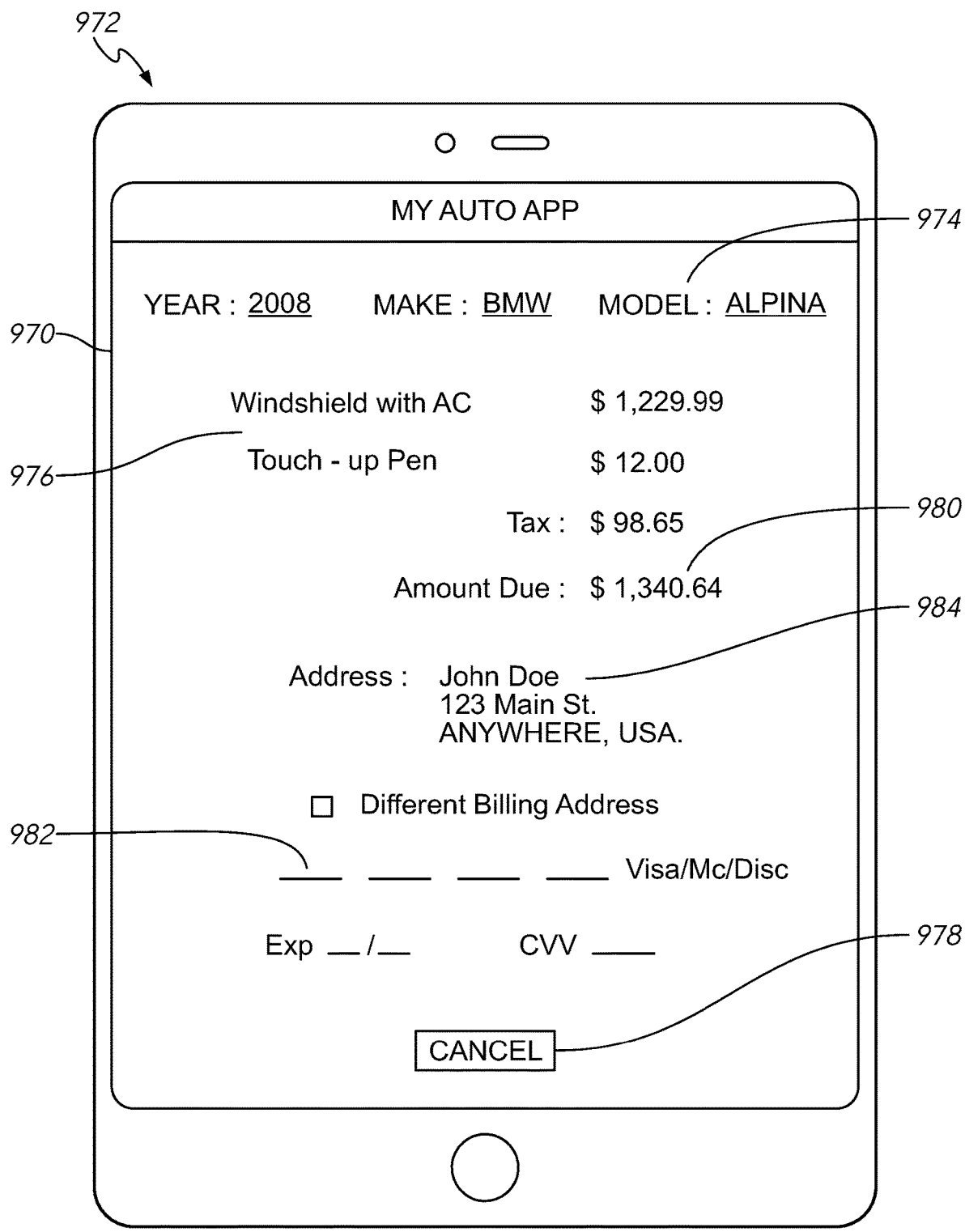
FIG. 18 shows a visual display on a hand-held device for processing a user's order and payment information.

If the user chooses to purchase products (170), the user's order and payment may be processed (180). FIG. 18 shows one embodiment of a visual display 970 on a hand-held device 972 for processing a user's order and payment information. In one embodiment, hand-held device 972 is a smartphone.

In one embodiment, the VIN, make, model, and year 974 of the vehicle are displayed for the user's reference. An itemized list of the items being purchased is displayed 976 to serve as confirmation. The user may make payment arrangements as well as provide an address where the parts will be shipped. In one embodiment, multiple parts and services may be ordered for multiple addresses. This feature may be implemented in any number of ways, such as by processing one payment while providing the user an option to provide separate shipping addresses for the different parts being purchased. Such feature can be coded in the software for the application, means for which are known in the art.

In one embodiment, the user's selected items and quantities are also listed to confirm the items and quantities that the user is purchasing. In the embodiment shown, the user may modify the order by selecting a CANCEL button 978 and returning to the previous screen. This will allow the user to selectively modify the items and quantities that the user wishes to purchase. A total cost of the user's order 980 may also be displayed.

The user may pay for his order through customary credit card channels, customary alternate payment arrangements, and/or by charging the purchase to a mobile phone account. Display 970 allows the user to enter payment information 982 and a billing address 984.

Once the order and payment information have been processed (180), the order can be submitted to an order processing server, such as a back end server, for proper processing and fulfillment.

Although the methods and apparatus described above, including those corresponding to the flow charts and figures in this patent, have been described separately, it is anticipated that any of the methods disclosed can be implemented individually or combined in any combination. Any of the methods, apparatus, implementations, or procedures described herein can include machine-readable instructions for execution by: (A) one or more processors, (B) one or more controllers, and/or (C) any other suitable processing device. Any apparatus, software, or method disclosed herein can be embodied in software stored on a non-transitory tangible medium such as, for example, a flash memory, a CD-ROM, a floppy disk, a hard drive, a digital versatile disk DVD, or other memory devices. Persons of ordinary skill in the art will recognize that the entire method and/or parts thereof could alternatively be executed by a device other than a controller and/or embodied in firmware or dedicated hardware in a known manner e.g., it may be implemented by an application specific integrated circuit (ASIC), a programmable logic device (PLD), a field programmable logic device (FPLD), discrete logic, or the like.

Although specific methods and apparatus are described with reference to flowcharts depicted herein, persons of ordinary skill in the art will appreciate that many other methods of implementing machine readable instructions may alternatively be used. For example, the order of execution of the steps may be changed, and/or some of the steps described may be changed, eliminated, or combined.

The methods and algorithms illustrated and discussed herein may have various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules, units, or other components, can be combined or segregated as hardware and/or software stored on a non-transitory computer-readable medium as modules in any manner, and can be used separately or in combination.

The terms data storage device, data storage system, data storage means, and the like, are used to refer to a combination of computer hardware and computer software for storing data in a predetermined organized manner on a computer readable medium. Such medium may be associated with a data storage server, a computer device, or the like, with a combined purpose of storing data and providing appropriate data in response to queries received. Accordingly, the terms data storage device, data storage system, data storage means, and the like, may be used interchangeably and are to be understood to mean such combination of hardware and software.

Communications between computer devices and/or other components in the computerized systems and methods disclosed herein may be unidirectional or bidirectional electronic communication through wired or wireless means, configuration, or network. For example, one device or component may be wired or networked wirelessly directly or indirectly, through a third-party intermediary, over the Internet, or otherwise, with another component or device to enable data communication between the components or devices.

Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, 5G network, and other communication networks known in the art, or which technologies may be utilized in the art in the future for such communications.

In some of the embodiments described herein, the data storage systems and servers, including software therefor and the contents of the data storage systems, can be automatically updated and maintained by a third party to provide the latest processing capability as well as the latest data for vehicles, vehicle models, vehicle manufacturers, and the like. Examples of data storage systems and servers include, but are not limited to, PCs, portable computers, shared servers available on a local area network or on a wide area network, or accessible via the internet. The data storage systems may serve as a repository for data to be accessed or queried by other computer devices and computer systems as well. The data storage systems may be owned, operated, and maintained by third parties and made available for commercial use at a cost.

Although the devices, systems, apparatus and methods have been described and illustrated in connection with certain embodiments, variations and modifications will be evident to those skilled in the art. Such variations and modifications may be made without departing from the spirit and scope of the present disclosure, and are therefore anticipated. The description and teachings herein are thus not to be limited to the precise details of methodology or construction set forth herein because variations and modifications are intended to fall within the spirit and scope of the present invention.

I claim:

1. A method for determining a part for a vehicle, comprising:
   determining the vehicle's vehicle identification number;
   determining the vehicle's manufacture information;
   identifying a specific part for the vehicle;
   determining whether a part code zone for the part exists on a vehicle identification label;
   if said part code zone exists on the vehicle identification label, then
      performing a zonal optical character recognition procedure on the vehicle identification label, and
      extracting a part code in said part code zone; or
   if said part code zone does not exist on the vehicle identification label, then
      determining a list of parts for the vehicle based on said vehicle's manufacture information, and
      selecting said part from said list of parts.

2. The method of claim 1, wherein
   determining the vehicle identification number comprises:
      capturing an image of the vehicle identification label;
      receiving said image by a server; and
      decoding at least a portion of said image.

3. The method of claim 2, wherein said portion of the image comprises a barcode or a QR code.

4. The method of claim 2, wherein:
   said server is a hand-held device, and
   said image is captured by a camera in said hand-held device.

5. The method of claim 4, further comprising transferring said image to one or more other computer devices, wherein said zonal optical recognition procedure is performed by said one or more other computer devices.

6. The method of claim 2, wherein determining said vehicle identification number further comprises:
   scanning coded image information on said vehicle identification label and converting said coded image information to a string of characters, or
   extracting a string of characters imprinted on said vehicle identification label.

7. The method of claim 1, wherein
   determining said vehicle identification number comprises:
      capturing an image of said vehicle identification label;
      performing an optical recognition procedure on said image; and
      determining said vehicle identification number from said optical recognition procedure.

8. The method of claim 1, wherein said vehicle's manufacture information is determined based on predetermined digits in said vehicle identification number.

9. The method of claim 8, wherein:
said vehicle's manufacture information or said list of parts for the vehicle is determined by querying a data storage system, and
said query is based on said predetermined digits in said vehicle identification number.

10. The method of claim 1, wherein said vehicle identification number is determined either by:
receiving the vehicle's vehicle identification number manually input by a user, or by
performing an optical recognition procedure on said vehicle identification label.

11. The method of claim 1, wherein identifying a specific part for the vehicle comprises:
performing a search for the part based on a string of characters input by a user; or
selecting a category of parts for the vehicle, said category of parts comprising at least one sub-category of parts or at least one part.

12. The method of claim 1, further comprising:
providing a selectable option to buy said part, and
processing an order and a payment if the user selects said option to buy said part.

13. The method of claim 12, wherein said part is a tire, a battery, a windshield, or a window.

14. The method of claim 1, further comprising determining an alternate part for said selected part.

15. The method of claim 1, further comprising:
identifying a second part for the vehicle;
determining whether a second part code zone for the second part exists on the vehicle identification label based on the vehicle's manufacture information;
if said second part code zone exists on said vehicle identification label, then:
performing a second zonal optical character recognition procedure on said vehicle identification label; and
extracting a second part code in said second part code zone, wherein said second part code corresponds to said second part; or
if a second part code zone does not exist on said vehicle identification label, then:
selecting said second part from said list of parts.

16. A computerized system comprising;
a server;
at least one processor in said server, said at least one processor operable to execute computer instructions;
a memory means operatively connected to said at least one processor; said memory means operable to store said computer instructions, wherein
said computer instructions are executable to:
determine the vehicle's vehicle identification number;
determine the vehicle's manufacture information;
identify a part for the vehicle;
determine whether a part code zone for the part exists on a vehicle identification label;
if said part code zone exists on the vehicle identification label, then:
perform a zonal optical character recognition procedure on said vehicle identification label; and
extract a part code in said part code zone, wherein said part code corresponds to said part; or
if said part code zone does not exist on said vehicle identification label, then:
determine a list of parts for the vehicle based on said vehicle's manufacture information; and
select said part from said list of parts.

17. The computerized system of claim 16, wherein:
determining said vehicle identification number comprises:
capturing an image of said vehicle identification label;
receiving said image by a server; and
decoding at least a portion of said image;
said portion of the image comprises a barcode or a QR code;
said server is a hand-held device; and
said image is captured by a camera in said hand-held device.

18. The computerized system of claim 16, wherein:
said vehicle's manufacture information or said list of parts for the vehicle is determined by querying a data storage system, and
said query is based on predetermined digits in said vehicle identification number.

19. The computerized system of claim 16, wherein identifying a part for the vehicle comprises:
performing a search for the part based on a string of characters input by a user; or
selecting a category of parts for the vehicle, said category of parts comprising at least one sub-category of parts or at least one part.

20. The computerized system of claim 16, wherein said computer instructions are further executable to:
provide a selectable option to buy said part; and
process an order and a payment if said option to buy said part is selected.

* * * * *